(12) United States Patent
Widmer

(10) Patent No.: US 9,347,423 B2
(45) Date of Patent: May 24, 2016

(54) DEVICE FOR OBTAINING ELECTRICAL ENERGY FROM HYDROPOWER

(71) Applicant: WRH Walter Reist Holding AG, Ermatingen (CH)

(72) Inventor: Felix Widmer, Winterthur (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 11 days.

(21) Appl. No.: 14/402,428

(22) PCT Filed: Mar. 14, 2013

(86) PCT No.: PCT/CH2013/000046
§ 371 (c)(1),
(2) Date: Nov. 20, 2014

(87) PCT Pub. No.: WO2013/173933
PCT Pub. Date: Nov. 28, 2013

(65) Prior Publication Data
US 2015/0159620 A1   Jun. 11, 2015

(30) Foreign Application Priority Data
May 24, 2012   (CH) .......................................... 723/12

(51) Int. Cl.
*F03B 7/00* (2006.01)
*F03B 17/06* (2006.01)
*F03B 13/00* (2006.01)

(52) U.S. Cl.
CPC ................. *F03B 7/006* (2013.01); *F03B 13/00* (2013.01); *F03B 17/063* (2013.01); *F03B 17/064* (2013.01); *F05B 2240/30* (2013.01); *Y02E 10/28* (2013.01)

(58) Field of Classification Search
CPC .......................................................... F03B 7/00
USPC .............................................. 415/3.1; 290/54
See application file for complete search history.

(56) References Cited

U.S. PATENT DOCUMENTS

| 973,869 | A | * | 10/1910 | Logan | F03B 13/264 415/141 |
| 1,457,927 | A | | 6/1923 | Ebel | |
| 1,483,505 | A | * | 2/1924 | Bradshaw | F03B 7/006 415/116 |
| 4,023,915 | A | * | 5/1977 | Kerby | F03B 17/063 415/148 |
| 4,383,797 | A | * | 5/1983 | Lee | F03B 17/062 405/22 |
| 4,390,316 | A | * | 6/1983 | Alison | F01D 1/14 415/202 |
| 4,419,049 | A | * | 12/1983 | Gerboth | F04D 29/403 415/119 |
| 5,440,175 | A | * | 8/1995 | Mayo, Jr. | F03B 7/003 290/53 |

(Continued)

FOREIGN PATENT DOCUMENTS

DE  1018000  10/1957
EP  1 731 756  12/2006

(Continued)

*Primary Examiner* — Joseph Waks
(74) *Attorney, Agent, or Firm* — Rankin, Hill & Clark LLP

(57) ABSTRACT

An onflow element for an installation for generating electrical energy from hydropower. The onflow element includes an onflow wall with an onflow side as well as a free immersion edge delimiting the onflow wall, wherein the onflow wall has a bending seen in a cross sectional plane transverse to the free immersion edge. The bending is designed in a manner such that the onflow wall is designed arched towards an onflow direction directed to the onflow side.

19 Claims, 16 Drawing Sheets

(56) References Cited

U.S. PATENT DOCUMENTS

| | | | | |
|---|---|---|---|---|
| 8,593,005 | B2 * | 11/2013 | Drews | F03B 7/00 290/43 |
| 8,686,585 | B2 * | 4/2014 | Lin | F03B 7/003 290/54 |
| 8,841,793 | B2 * | 9/2014 | Wang | F03B 13/10 290/43 |
| 2005/0286975 | A1 | 12/2005 | Fonfrede et al. | |
| 2010/0181773 | A1 * | 7/2010 | Reist | F03B 17/066 290/54 |

FOREIGN PATENT DOCUMENTS

| | | | | |
|---|---|---|---|---|
| EP | 1 980 745 | | 10/2008 | |
| FR | 2 613 780 | | 10/1988 | |
| GB | 2 434 351 | | 7/2007 | |
| GB | 2434351 A | * | 7/2007 | B63H 1/04 |
| JP | 2003042049 A | * | 2/2003 | |
| WO | 2011/041918 | | 4/2011 | |

* cited by examiner

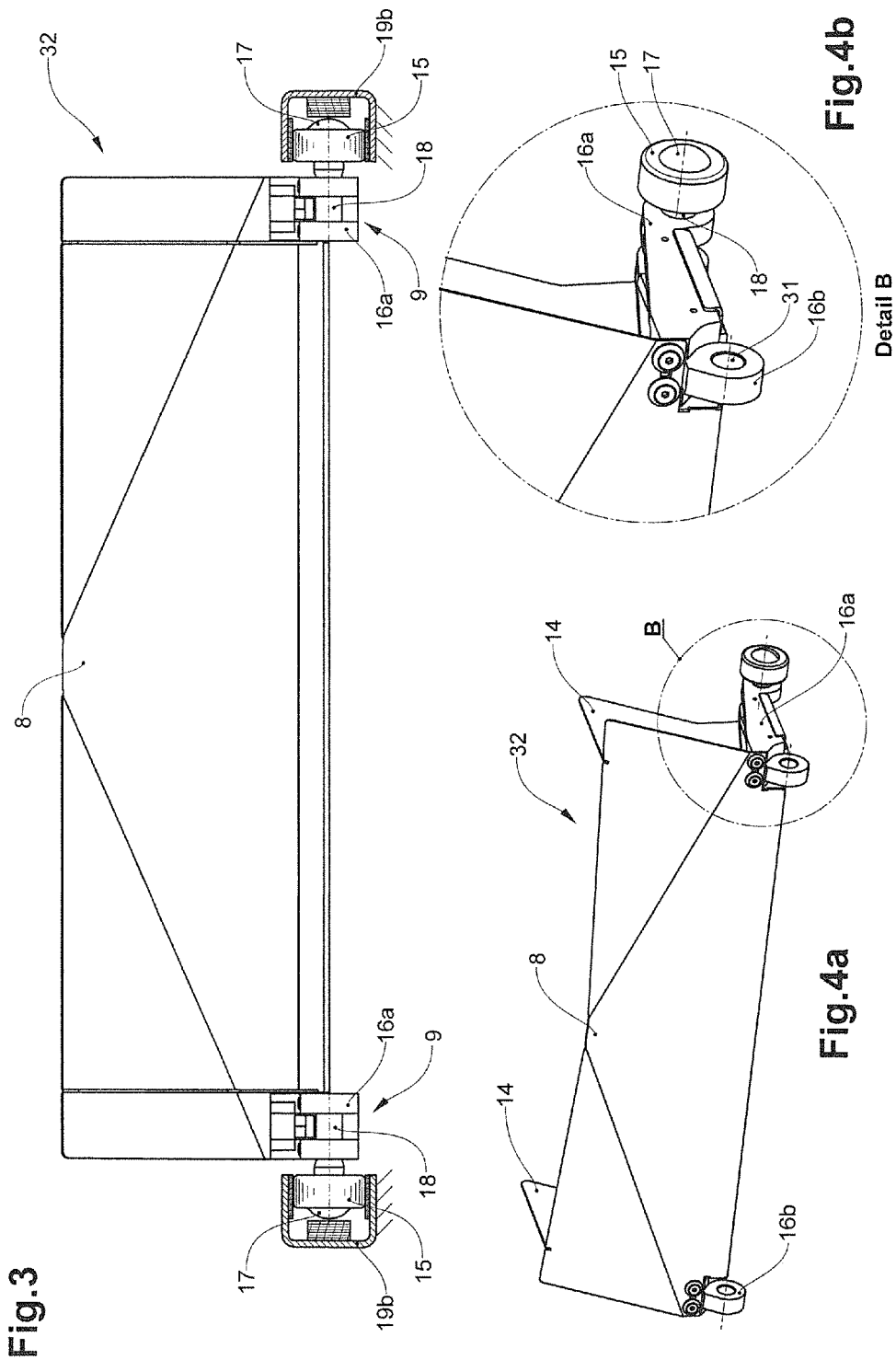

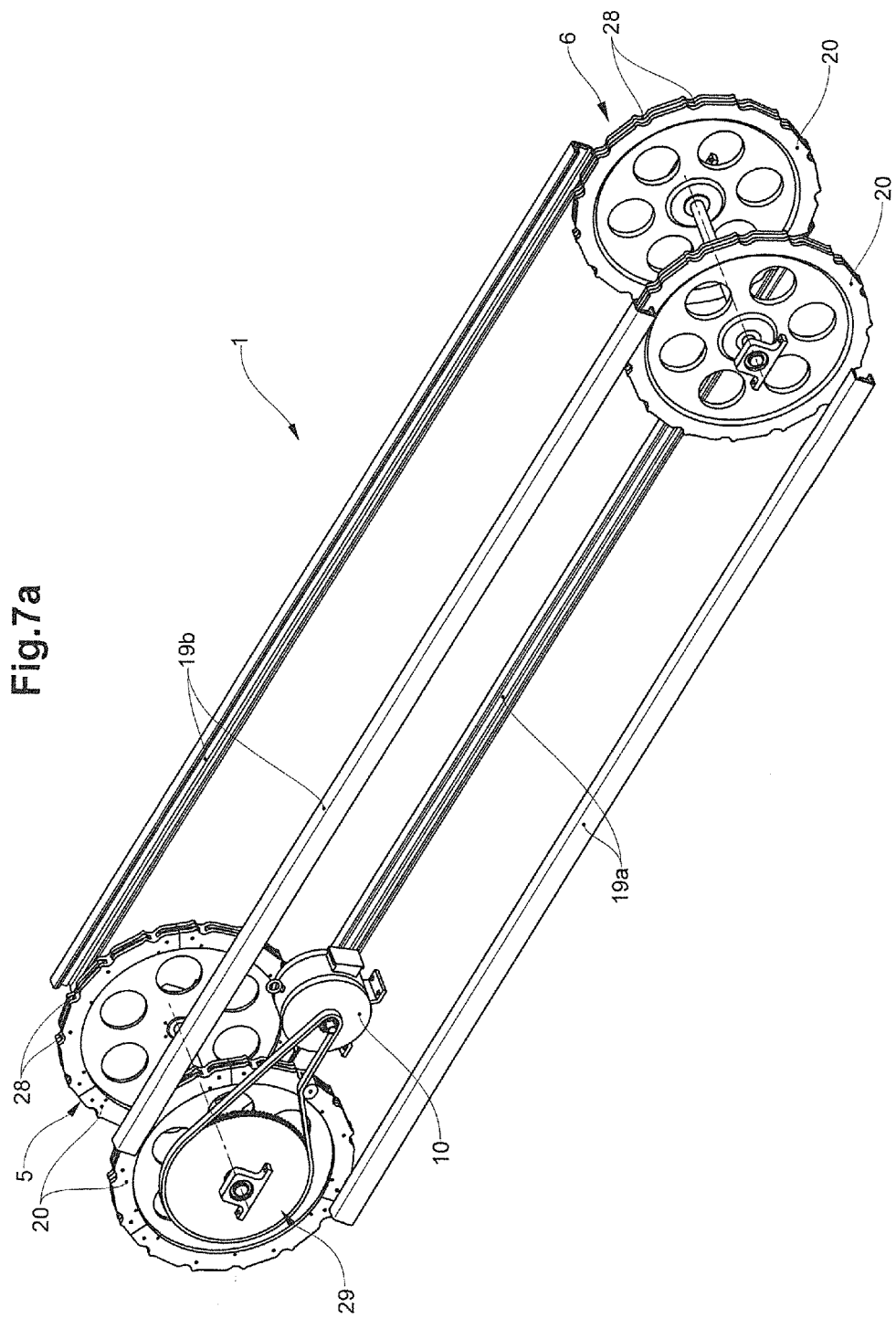

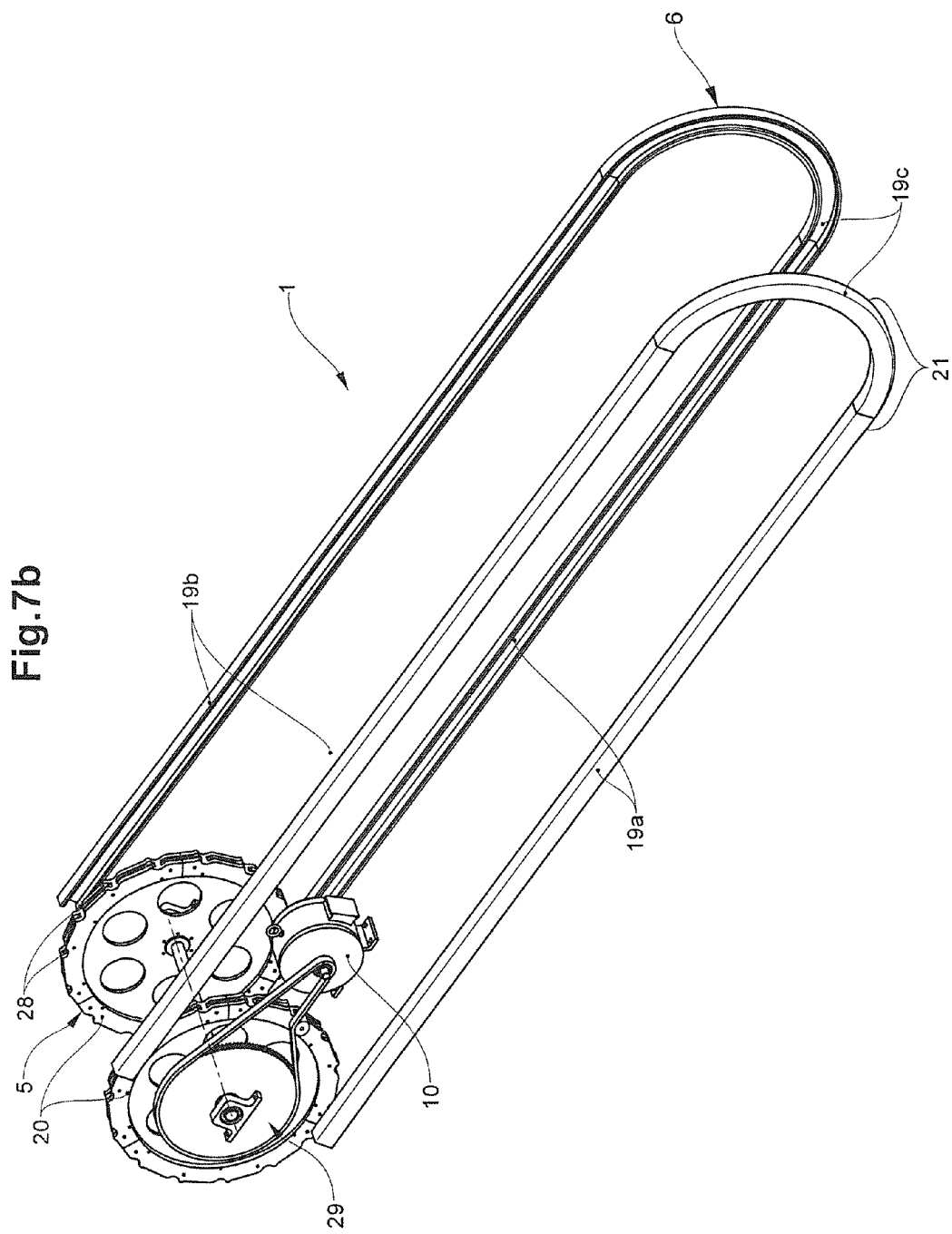

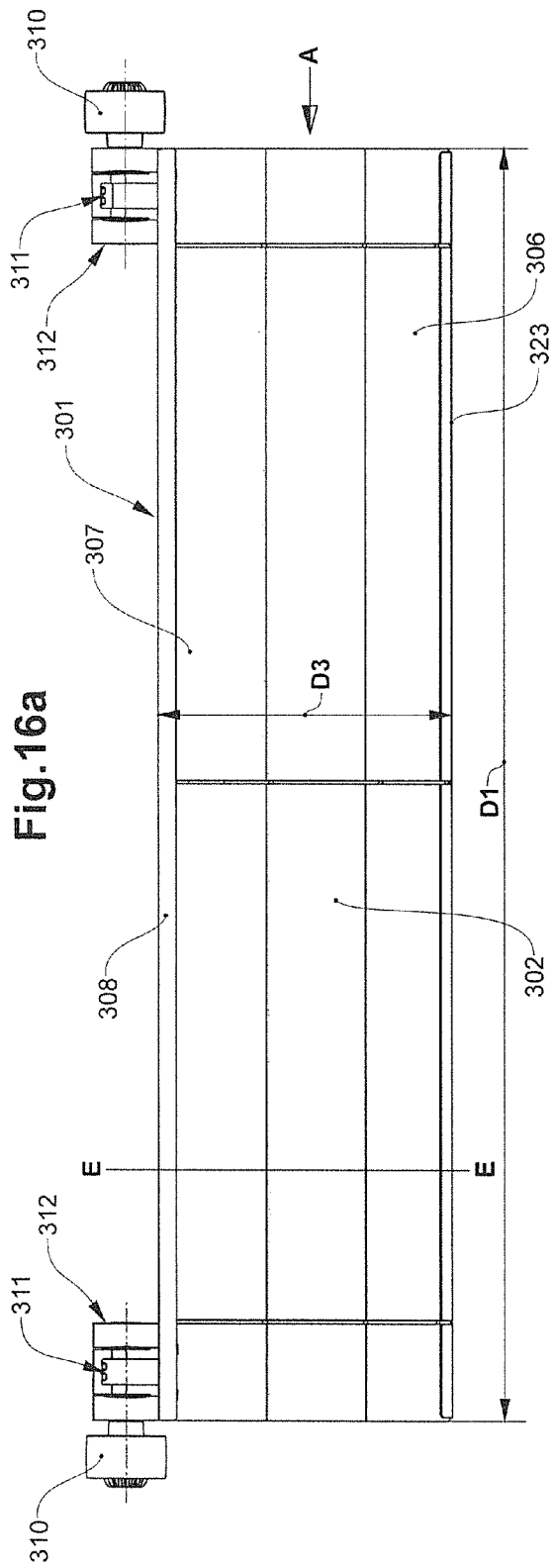
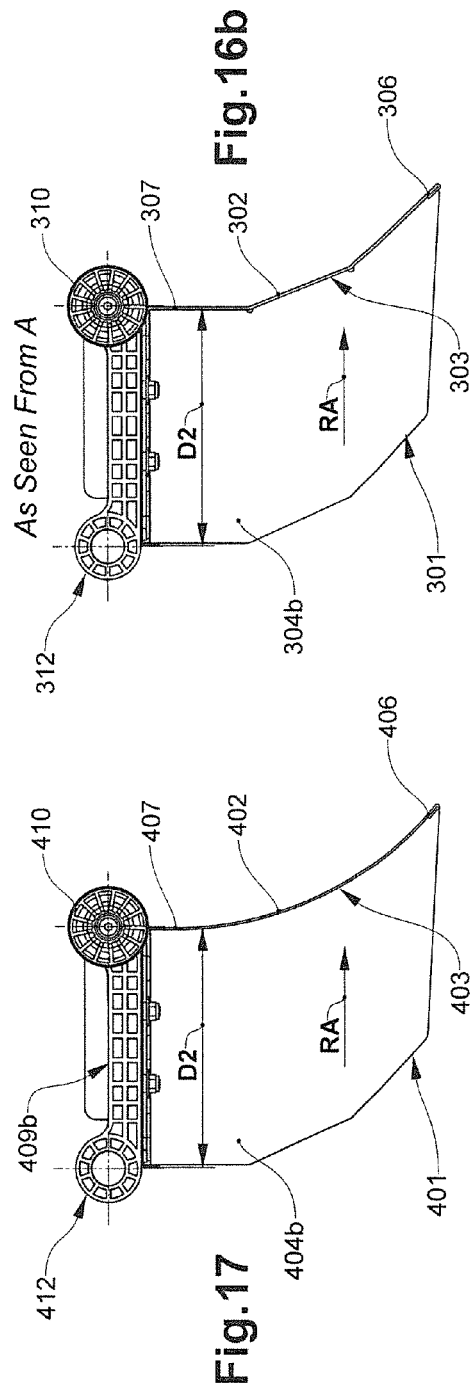

DEVICE FOR OBTAINING ELECTRICAL ENERGY FROM HYDROPOWER

BACKGROUND OF THE INVENTION

The invention relates to an onflow element for and installation for generating electrical energy from hydropower, wherein the onflow element comprises an onflow wall with an onflow side, as well as a free immersion edge which delimits the onflow wall. The onflow wall has a bending considered in a cross-sectional plane transverse to the free immersion edge.

The function of the onflow wall lies in the coupling of the mechanically usable power between the installation and water taking place on this. The term "water" here is to represent a fluid medium, in particular a water-containing, fluid medium that is suitable for generating electrical energy amid the utilisation of its kinetic and/or potential energy. The term "water" in particular includes drinking water, waste water, treated sewage water, process water as well as water from watercourses.

Moreover, the invention relates to an installation for generating electrical energy from hydropower, comprising a plurality of onflow elements according to the invention, which are arranged one after the other, are led in a revolving manner along a revolving direction in a closed revolving path and are drivable in the revolving direction by way of hydropower, wherein the onflow elements are led along the load section in a water guidance channel.

A multitude of devices are known, which utilise the potential drop of water or its kinetic energy, in order to generate electrical energy therefrom. In this context, one basically differentiates between two installation types.

According to a first installation type, a part of the kinetic energy of the onflowing water is utilised, in order to drive a generator for electricity production. For this, onflow elements such as turbine blades are provided, onto which water flows and which are set in motion by way of the water flow. Hydropower installations of the first type are to be found in river power stations or storage power stations. The middleshot-undershot waterwheel is also driven in this manner.

According to a second installation type, it is not primarily the kinetic energy of the onflowing water, but rather its potential energy that is released while undergoing a potential drop, which is utilised. This means that according to this principle, the gravitation force of the water acting on the onflow element drives an onflow element. This principle is utilised, for example, with an overshot waterwheel.

EP-A-1 731 756, for example, describes a hydropower installation, with which the potential energy of water is utilised for generating electrical energy. The installation comprises a hydropower unit with a vertical shaft, and a generator connected to the hydropower unit. Blades, which receive a certain volume of water, are arranged in the shaft in a manner fastened on a chain. The chain and, via this, a generator are driven by the weight of the water bearing on the blades. The installation is however comparatively inflexible with regard to its application possibilities, since these can only be carried out in combination with a vertical shaft.

WO 2011/041918 likewise describes an installation for generating electrical energy from hydropower including a revolving drive chain with a load section and return section. The drive chain is led in a revolving direction around two deflection elements that are arranged horizontally as well as vertically offset to one another. The drive chain includes a plurality of onflow elements that are arranged one after the other in the revolving direction and are spaced from one another. The drive elements in each case form part of a chain link of the drive chain. The onflow elements on the side of the load section engage into an inclined water guidance channel and with the lateral channel walls as well as the channel base form water receiving compartments. The individual water receiving compartments in the run-in region accommodate a certain volume of water, which is not let out of the water receiving compartment again until in the outlet region.

Moreover, the installation includes a generator for generating electrical energy from the revolving drive chain. The water is fed into the water guidance channel at a run-in region that is situated at a higher level, wherein the blades immersing into the water guidance channel hold back the flowing-in water, in the formed water receiving compartments. The blades are driven by the force weight of the water, by which means the water is led in the receiving compartments along the water guidance channel to an outlet opening which is situated as a lower level.

The described solution has the disadvantage that the guiding of the blades in the water guidance channel is quite imprecise, so that the receiving compartments in the movement direction are too permeable with regard to the entrained water, and a part of the entrained water runs down the water guidance channel to the outlet region, while not being utilised.

SUMMARY OF THE INVENTION

It is therefore the object of the present invention, to optimise the guiding of the onflow elements in the run-in region, by way of a particular geometric design of these, in order to increase the efficiency of the installation.

The present invention includes a bending of onflow element that is designed such that the onflow wall is arched towards an onflow direction directed to the onflow side.

The initially mentioned cross-sectional plane, to which the inventive bending of the onflow element relates, lies parallel to the revolving direction of the onflow element with regard to the mentioned installation.

The free immersion edge is preferably arranged running in front of the onflow wall, considered in the onflow direction to the onflow side.

According to a particular embodiment of the onflow element, this includes a guide for guiding the onflow element along a guide device of the installation. The onflow wall comprises a guide-side wall end section that lies opposite the free immersion edge. The free immersion edge considered in the onflow direction to the onflow side is arranged running in front with respect to the guide-side wall section and/or with respect to a wall section arranged between the guide-side wall section and the free immersion edge.

With regard to the installation for generating electrical energy from hydropower that is described in detail further below, this means that the free immersion edge is arranged in a manner running in front of the mentioned wall section or the mentioned wall sections, considered in the revolving direction R of the onflow elements.

With respect to the mentioned installation, the second wall section is furthermore arranged towards the channel opening, and the free immersion edge towards the channel base.

The bending of the onflow wall considered in the mentioned cross-sectional plane can be formed by a polygon course of at least two plane wall sections that meet one another at an angle.

Moreover, the bending of the onflow wall considered in the mentioned cross-sectional plane can also be formed by one or more put-together arc pieces, in particular circular arc pieces, each with an arc radius. The middle points of the arc radii are thereby arranged running in front the onflow wall considered in the onflow direction to the onflow side.

A combination of straight sections and circular arc pieces in an infinite arrangement is likewise possible for forming the mentioned bending.

The onflow wall due to its bending can also be called a blade. The working or active surface of the onflow wall which that corresponds to the onflow side, however, in contrast to conventional turbine blades, does not lie on the concave side but on the convex side of the onflow wall designed in an arched manner.

The onflow element according to the invention in particular is designed and led in the mentioned installation, in a manner such that the onflow wall in the run-in region immerses into the water stream with its free immersion edge in front.

The free immersion edge forms the closure of a free wall end section of the onflow wall. According to a preferred further development of the invention, in the run-in region, the onflow wall with its free wall end section immerses into the water stream transversely to the water stream and in particular at an angle of 45° to 90° degrees (angle degrees), in particular of 70° to 90°. The angular details relate to the water surface or the onflow direction.

In contrast to the known onflow elements according to the state of the art, the onflow element according to the invention no longer hits the water surface in a surfaced manner, due to its particular geometry. The free wall section or its free immersion edge in contrast acts as a type of cutting edge, which on immersion interrupts or separates the water stream or portions the water stream.

A smoother running of the installation is achieved by way the impacting of the onflow element onto the water surface. The installation according to the invention therefore during operation produces less shaking and noise. Moreover, the friction is also lowered and the efficiency thereby increased.

The wall-like onflow elements each preferably have at least one stiffening element, also called reinforcement element, so that they obtain an adequately high stiffness in order to withstand the water weight. Preferably, the onflow elements each include at least two stiffening elements that are arranged off-centred or laterally. The stiffening elements are preferably arranged in a lateral end region of the onflow elements. The stiffening elements can e.g. be designed as stiffening ribs or stiffening walls or stiffening transverse walls.

The stiffening element is preferably arranged transversely to the onflow wall. The stiffening element is moreover preferably arranged on the onflow side of the onflow wall. Moreover, the stiffening element is usefully connected to the onflow wall. The stiffening element can be attached onto the onflow element via a non-positive fit connection, a positive fit connection or material fit connection. A combination of the mentioned connection types is also possible. The stiffening element can in particular be stuck on, bonded or welded.

With regard to the installation described further below in detail, the stiffening element, in particular the stiffening transverse wall preferably has an alignment parallel to the onflow direction of the water, or to the revolving direction of the onflow elements or to the longitudinal direction of the water guidance channel The stiffening transverse walls can be closed or provided with openings. The stiffening walls in particular can also be designed as an open latticework construction.

According to a particularly preferred embodiment of the invention, the onflow element comprises two stiffening transverse walls which are arranged laterally off-centred and aligned parallel or essentially parallel to the revolving direction of the onflow element. The depth of the transverse stiffening walls, i.e. the width of the stiffening transverse walls along the revolving direction of the onflow element is preferably more than 70%, in particular more than 80% and particularly preferably more than 90% of the depth of the water receiving compartment, i.e. of the width of the water receiving compartment longitudinally to the revolving direction.

The stiffening transverse walls are preferably arranged relatively close, but in a contact-free manner to the lateral channel walls. Thus these can be arranged, for example, at a distance of less than 10%, in particular less than 5% of the channel width, to the channel walls.

The stiffening transverse walls according to this arrangement exert a calming effect on the leading of water in the water receiving compartment. Thus, for example, the eddy formation of the water in the water receiving compartment is significantly reduced.

The onflow element according to a further development of the invention includes an interface wall that connects to the second wall end section of the onflow wall transversely to this and extends over the width extension of the onflow wall. The interface wall is arranged open towards the channel opening with respect to the installation described in detail further below. The interface wall in the load section preferably runs parallel to the channel base.

According to a preferred further development of the invention, the guide is attached on the interface wall.

The onflow element has a width extension and a height extension. The width extension (extension of the onflow element transverse to the water guidance channel) of the onflow element is usefully significantly larger than its height extension (extension of the onflow element along the height of the water guidance channel). Thus, the ratio of the width to the height is preferably 2:1 or greater, and in particular 3:1 or higher or even 4:1 or larger.

Moreover, the width extension of the onflow element is preferably significantly larger than the depth of the formed water receiving compartments (extension of the water receiving compartments along the water guidance channel). Thus, the ratio of the width to the height is preferably 2:1 or greater and in particular 3:1 or greater or even 4:1 or greater.

Thanks to the specified length ratios, better filling results can be achieved for the water receiving compartments. This among other things is due to the fact that the width of the water feed in the run-in region is comparatively large in comparison to the depth of the water receiving compartments to be formed, which permits a rapid and accordingly high filling of the water receiving compartments. The width of the onflow elements can, for example, be about 1000 mm, while the depth is about 250 mm.

Moreover, the onflow element according to a preferred further development of the invention includes a connector for connecting several onflow elements one after the other into a chain-like drive arrangement.

The connector is preferably arranged in the region of the guide means and in particular are attached on the interface wall. According to a particular embodiment, the guide and connector are combined or coupled to one another in a functionally technological manner.

The guide can comprise guide rollers or sliding elements. The sliding elements can be, for example, sliding blocks. The term "rollers" includes all bodies which are suitable for rolling over a surface. Wheels, disks and balls, for example, are also included thereunder.

According to a particular embodiment, the guide includes guide rollers that are arranged on the connector and are connected to connector via a roller pivot. The roller pivot simultaneously forms the connection element between two onflow elements.

The onflow elements are preferably designed in a lightweight construction manner. In other words, the wall elements are preferably designed in a thin-walled manner. Moreover, the onflow elements are preferably manufactured of a lightweight construction material, such as aluminum or plastic, in particular a fiber composite material. The onflow elements can also be designed of an aluminum-plastic-aluminum composite plate element. The water retaining elements can also consist of corrosion-resistant stainless steel.

The onflow elements are preferably designed of several parts. Thus, the guide elements and, as the case may be, connection elements as well as the onflow wall, as the case may be with their reinforcement structures, are preferably designed as separate components.

The invention moreover relates to relates to an installation for generating electrical energy from hydropower, including a plurality of onflow elements according to the invention, which are arranged one after the other, are led in a revolving manner along a revolving direction in a closed revolving path and are driveable in the revolving direction by way of hydropower.

The installation moreover includes a load section running along a descent, wherein the onflow elements are led along the load section in a water guidance channel.

According to a first embodiment variant, the installation comprises a drive arrangement of a plurality of onflow elements arranged one after the other in the revolving direction, the drive arrangement revolving around at least two deflection elements that are spaced from one another. The installation according to a first embodiment variant, at least along the load section includes a guide device, in which the guide of the onflow elements are displaceably arranged such that the onflow elements are guidable between the two deflection elements at least in the region of the load section.

According to a preferred further formation, the guide device includes at least one guide rail. The guide preferably comprise runner rollers or sliding elements that are led in the guide rail.

The installation in the load section includes a water guidance channel that runs along the descent or a slope. The onflow walls of the onflow elements in the region of the load section run transversely to the water guidance channel and engage into the water guidance channel. In each case, two onflow walls that are adjacent in the flow direction, together with lateral channel walls form a compartment for receiving water and which is co-moved along the water guidance channel. The onflow walls, which are subjected to onflow by water in the run-in region, thus serve as a compartment separation element. The water receiving compartments are preferably open to the top.

The individual water receiving compartments in the run-in region accommodate a certain volume of water, which is not released from the water receiving compartment again until in the outlet region.

The water guidance channel, or also called trough, preferably forms a U-shaped cross sectional profile with a channel base and two channel side walls. The onflow elements are usefully led in the water guidance channel in a contact-free manner. The water guidance channel runs between the upper and lower deflection element, preferably parallel to the guide rail or guide rails.

According to a preferred further development of the invention, the onflow elements seen in the revolving direction each include two laterally arranged guides. The installation in the load section comprises two guide rails which are, in each case, arranged laterally on the water guidance channel, wherein the guides are led in the guide rails along the load section.

The guide rail can, for example, be a profile longitudinal body with a guide channel for the guiding receiving of the guide, in particular of runner rollers or sliding elements.

The guide rails or the guide channel includes a runner surface for the guide elements, for example a sliding surface for sliding elements or a rolling surface for runner rollers, also called guide rollers.

The guide channel is preferably designed such that this forms a sliding surface or rolling surface at two sides lying opposite one another.

Moreover, the guide rail or the guide channel preferably also forms a guide surface for the side guidance elements, which lies transversely to the running surface.

The guide channel is preferably designed in a U-shaped or C-shaped manner and comprises, for example, two profile limbs and a connection wall. The guide channel is open towards the guide elements. According to a particular embodiment, the guide channel is open towards the water guidance channel.

One of the profile limbs, for example, forms the running surface of the guide elements. The connection wall between the two profile limbs, for example, forms the guide surface for the side guidance element. Since the onflow element comprises at least one guide element, preferably at both sides, accordingly in each case a guide rail is provided on both sides of the onflow element. These preferably run parallel to one another.

The onflow elements are preferably positively guided via the guide elements led in the guide. "Positively guided" means that the guide elements are guided via guide in at least two spatial directions with respect to a three-dimensional orthogonal or polar coordinate system. These spatial two directions are preferably opposite to one another.

Since the position of the onflow elements relative to the water guidance channel can be fixed in a very accurate manner thanks to the positive guiding by the guide, the onflow wall has only very small distances to the adjacent channel walls. The gap distance can, for example, be merely 1 to 5 mm, in particular merely 2 to 3 mm.

The two deflection elements are preferably arranged offset to one another, horizontally as well as vertically.

A first, upper deflection element is preferably arranged in the run-in region, in which the water is admitted into the water guidance channel. A second, lower deflection element is preferably arranged in an outlet region, in which the water is released out of the water receiving compartments.

Of course, still further deflection elements can be provided between the upper and the lower deflection element.

The onflow elements are led back along the return section out of the outlet region into the run-in region. The return section preferably runs above the load section. The return section is preferably led parallel to the load section. The return section moreover runs above the leading of the water.

The water in the run-in region can flow in parallel to the revolving direction, thus frontally onto the onflow wall of the onflow element and into the water guidance channel. With certain configurations, in the run-in region, however seen in the revolving direction, the water preferably flows in laterally obliquely up to the onflow wall of the onflow element and into the water receiving compartments. A combination of a frontal and laterally oblique onflow is also possible.

The design of the drive arrangement can be different with regard to the functional interaction between the individual onflow elements.

According to a first embodiment of the first embodiment variant, the onflow elements are not connected to one another, i.e. are designed independently of one another with regard to connection technology.

The drive arrangement according to this embodiment is driven by the transmission of compression forces between the onflow elements. The onflow elements are designed as compression bodies and contain force transmission elements for transmitting compression forces from an onflow element trailing in the revolving direction, preferably directly, onto an onflow element running in front.

The force transmission elements can, for example, form pressure surfaces, via which the compression forces between the onflow elements are transmitted further. In this manner, the drive arrangement can be moved around the defection elements in the peripheral direction similarly to a drive chain, without the onflow elements however being connected to one another.

According to a second embodiment of the first embodiment variant, the onflow elements are articulately connected to one another via the connector, into a drive arrangement that is coherent in a chain-like manner.

The drive arrangement here is designed as a coherent drive structure, similarly to a drive chain, with a plurality of coherent drive elements in the form of drive links, similar to the chain links. The onflow elements comprise the connector for the articulated connection of adjacent onflow elements, into a drive structure.

The onflow elements of the drive structure according to this embodiment can be driven in the revolving direction by way of transmission of tensile forces, compression forces or a combination of tensile and compression forces.

According to a preferred further formation of the invention, the onflow element seen in the revolving direction comprises two guide means each arranged laterally off-centered, and as the case may be, also two connectors that are also each arranged laterally in an off-center manner.

The guide serves for the positive (forced) guiding of the onflow element at least on the region of the load section, along the water guidance channel.

The optional connector serves for the articulated connection of adjacent onflow elements into a chain-like drive arrangement. The onflow elements are in particular pivotably connected to one another in a plane parallel to the movement direction or revolving path of the drive structure.

According to a particularly preferred embodiment of the invention, the guide and the connector are coupled to one another in a functionally technical manner. Thus, the guide can include guide rollers, which are rotatably mounted on the onflow element via roller pivots. The roller pivot simultaneously serves as a connection pivot between two adjacent drive elements. The connection pivot and roller pivot can, however, also be designed as independent components.

According to a particular embodiment of the connector, the onflow element in each case on each side includes a fork-like receiver element with fork lugs which define openings for leading through a connection pivot. Furthermore, the onflow element includes a receiver body that lies opposite the fork-like receiver element along the movement direction, for example, in the form of a lug, with an opening for leading through the connection pivot.

The receiver body now on both sides of the onflow element is pushed between the fork lugs of the fork-like receiver element of the adjacent onflow element and the connection pivot is pushed through the openings in the fork lugs and the receiver body, for creating the connection between two onflow elements. The connection pivot as already mentioned can correspond to the roller pivot.

The guide elements, in particular the guide rollers, considered in the revolving direction are preferably arranged in each case outside the lateral end of the onflow element. The guide elements further preferably each comprise a side guidance element that is directed laterally outwards towards the guide rail. The onflow elements are led via the side guidance elements on both sides transversely to the water guidance channel.

The side guidance element is preferably calotte-like or is designed as a guide cap, and is in guiding contact with the guide rail.

According to a particular embodiment variant of the invention, the deflection elements are formed by arch sections of the guide rails that connect the guide rails to one another in the load section and the return section. In this manner, the onflow elements are also positively guided in the deflection region by the guide rails. The arch pieces of the guide rails can also be part of the deflection element, which, for example, can also comprise a rotation body as described further below.

If U-guide profiles or C-guide profiles, which are open towards the water guidance channel, are used, these comprise guide surfaces for the guide elements, wherein these guide surfaces lie opposite one another. By way of this, the onflow elements in the region of the load section are not pressed away upwards or lifted, by way of the water pressure.

According to a preferred further formation of the invention, one of the deflection elements, in particular the upper deflection element arranged in the run-in region comprises a rotation body, in particular a drive wheel, which is driven by way of the movement of the drive arrangement led around the rotation body over part of the periphery. The drive arrangement, for example, is engaged with the rotation body in a part-peripheral manner with a positive and/or friction fit, so that this rotation body is driven by the drive arrangement, for example, with the speed of the drive arrangement.

If the deflection element is formed by the guide rail itself, then the above mentioned as well as subsequently described rotation body is assigned to the deflection element. The rotation body and guide rail also according to definition can also together form the deflection element, since both devices participate in the deflection of the drive arrangement.

The drive wheel of the deflection element, for example, along its periphery includes drive recesses, into which elements of the onflow elements engage and drive the drive wheel. These elements can be connection elements of drive links or roller pivots of guide rollers.

The mentioned deflection element is coupled, for example, to the electricity production generator. The generator can be coupled directly onto the rotation shaft of the rotation body. Moreover, the rotation movement can also be transmitted via a gear, from the rotation body onto the generator.

The electricity production generator coupled to the upper deflection element is thereby driven by the compressive force and/or tensile force of the onflow elements, in particular of the drive links.

The electricity production generator can also be part of a tow drive, with which the drive arrangement or the moved onflow elements in the load section drive a revolving, flexible force transmission element, which in turn drives the electricity production generator.

According to a particular embodiment of the invention, that deflection element, to which no electricity production generator is assigned, or both deflection elements, include arcuately running guide rails that are arranged on both sides of the onflow elements and in which the onflow elements are positively guided via their guide elements and are deflected out of the load section into the return section, or vice versa.

According to a particular embodiment of the invention, the onflow elements are positively guided via their guide elements along the complete revolving path in the guide rails. This means that the installation along the revolving path of the drive arrangement includes a closed, positive guiding for the onflow elements. The closed positive guiding is particularly applied with drive arrangements, with which the onflow elements are not connected to one another, i.e. are not chain-linked to one another.

This embodiment has the further advantage that no chain of drive elements connected to one another needs to be tensioned.

The lower deflection element, which is assigned to the outlet region, includes guide rails preferably running in an arcuate manner. The arched course of the guide profiles preferably has a transition arch that runs from the load section or return section into the deflection element and that is design as a clothoid.

A body led along a clothoid arch has a uniform angle change, by which means, for example, transverse impacts that arise with a transition from a straight path section onto a circular arc are avoided in the deflection region. Moreover generally, transverse accelerations perpendicular to the movement path, and in particular acceleration peaks are reduced. The radius of curvature along the clothoid arch moreover continuously reduces, departing from the straight path section.

The water guidance channel and accordingly the load section and, as the case may be, also the return section preferably run in an inclined plane. This means that the onflow elements in these regions are moved linearly and with a constant inclination angle to a horizontal plane. However, it is also conceivable for the inclination angle to be variable in the region of the load section and/or return section. The water guidance channel and, accordingly, also the load section can also be integrated into several channel sections or load part sections, which compared to the adjacent sections each case have a different inclination angle.

The inclination angle α of the oblique plane is greater than 0°. Moreover, the inclination angle α is smaller than 90° (angle degrees). Preferably, the inclination angle is larger than 10° and in particular larger than 20°. Moreover, the inclination angle is preferably smaller than 80° and in particular smaller than 70°. Particularly preferably, the inclination angle lies in a region of 30° to 60°.

The installation, in particular the drive arrangement and the deflection elements, are preferably assembled in a mount. The mount and the assembly of the operating components are preferably designed such that the inclination of the drive arrangement or of the load section as well as, as the case may be, also the length of the load section can be set and thus can be adapted to different channel descents and channel lengths.

The installation can further envisage a relief channel, which for example is led below the water guidance channel. The water stream led via a feed channel to the water guidance channel can be partly or completely diverted into the relief channel by way of this, while avoiding the run-in region. For this, a guide element is provided, which can be activated and which controls the inflow into the relief channel or into the run-in region.

It is also possible for the drive arrangement together with the rail guidance assigned to this, and the defection elements, to be able to be lifted out of the water guidance channel by way of a lever mechanism via a control. The lifting of the mentioned elements can be provided for reasons with regard to safety technology, for example, for protecting the installation given flooding, or for overhaul proposes.

Water is admitted into the inclined water guidance channel of the installation at a higher situated run-in region, for operating the installation. Onflow elements are guided by the upper deflection element in an arched, in particular circular movement path out of the return section into the run-in region and immerse into the water guidance channel.

During the immersion procedure, water flows from a feed channel into the water guidance channel and flows onto the immersing onflow element. The onflowing water is then led into the water receiving compartments being formed at the same time. The water hereby is held in the water receiving compartments. In other words, the water cannot freely run down the water guidance channel.

According to the first embodiment variant described above, the water held in the receiving compartments drives the onflow elements due to its drop in potential, thus due to gravity, along the water guidance channel in the direction of the lower deflection element or outlet region. This means that water flowing onto the immersing onflow element in the run-in region is dammed at the onflow wall during the immersion of the onflow element into the water stream and is thus held back in the water receiving compartment simultaneously forming.

The mechanical energy is accordingly extracted primarily from the potential energy of the water. The onflow elements and accordingly the drive arrangement here is driven by the weight force of the water in the water receiving compartments, thus by way of their gravitational pressure.

Accordingly, the run-out speed of the water on leaving the water guidance channel corresponds essentially to the run-in speed of the water on entry into the water guidance channel.

For this reason, the onflow element of the first embodiment variant can also be called a gravitation pressure transmission unit or water retention element, and the onflow wall also be called a water retention wall.

According to a second embodiment variant, the onflow elements are part of a middleshot or undershot drive wheel. The onflow elements are arranged radially outside on the drive wheel along the periphery. The onflow elements can, for example, be arranged on spokes of a drive wheel designed as a spoked wheel.

Since the drive wheel is designed as a rigid construction, the onflow elements attached thereon are likewise positively guided.

The installation according to the second embodiment variant likewise includes a water guidance channel with a channel base and two lateral channel walls, said water guidance channel being arranged in a load section of the drive wheel. The onflow elements immerse into the water guidance channel at a higher situated run-in region Thereby, here too, two onflow elements directly subsequent one another, together with the water guidance channel form a water receiving compartment.

The water then in the higher situated run-in region runs into the water guidance channel and is received in the forming water receiving compartments. The drive wheel is driven via the onflow elements by way of the kinetic energy entrained by the flowing water. The water is led in the receiving compartments into the lower situated outlet region and there is again let out of the receiver compartments. The run-in region can be at the height of the drive hub or situated more deeply.

According to this second embodiment variant, the onflow elements are driven by the kinetic energy of the water. The mechanical energy is accordingly obtained primarily from the kinetic energy of the water. Accordingly, the run-out speed of the water on leaving the water guidance channel is significantly lower than its entry on entry into the water guidance channel.

The term "onflow element" thus does not relate to the type of extraction of mechanical power from the kinetic or potential energy of the water, but rather to the onflow on the mentioned elements in the run-in region for the purpose of filling the water receiving compartments.

The onflow elements at the lower deflection element via an arched or even part-circular movement path are pivoted out of the load section and accordingly out of the water guidance channel, so that the entrained water is released in the outlet region out of the water receiving compartments and can be led away.

The outlet region can be designed in a manner such that the water can exit downwards vertically or essentially vertically. For this, a type of shaft opening can be formed in the outlet region. By way of this, one prevents residual water being entrained by the onflow elements into the deflection, being led upwards and the efficiency of the installation being reduced on account of this.

The installation is operated in a power-variable manner, wherein the revolving speed can be adapted to the inflow speed of the water.

The installation is thereby controlled with a closed loop such that the drive arrangement or the onflow elements move with a constant speed given constant inflow quantities.

One can moreover envisage the inclination angle be changed, for example, according to power requirements.

The hydropower installation according to the invention can be applied wherever water must flow through a height difference. This can, for example, be flowing waters or outlets from dam installations. The application of the installation according to the invention is particularly suitable for already existing hydro-technical constructions or other industrial plants, since the government regulations for constructions in flowing waters can be quite strict.

Thus the installation is applied for example with sewage treatment installations, for example, before the purified water is released into a water, or in industrial plants, in which larger quantities of process water are applied for processes. The installation according to the invention is already suitable for altitude drops of 2 to 20 m.

The positive guiding of the onflow elements in the load section permits an exact alignment of the onflow elements in the water guidance channel. For this reason, the onflow elements that are led in a preferably contact-free manner in the water guidance channel can be designed with comparatively low tolerances with respect to the water guidance channel.

BRIEF DESCRIPTION OF THE DRAWINGS

The invention is hereinafter explained in more detail by way of figures. The figures merely show a few particular embodiments and further developments, which in no way are to be seen as being conclusive. There are shown in:

FIG. 3 is a front view of an onflow element led in a guide rail;

FIG. 4a is a further perspective view of an onflow element,

FIG. 4b is an enlarged detail of the connection element of an onflow element according to FIG. 4a;

FIG. 7a is a perspective view of the deflection elements with guide rails according to a first embodiment, FIG. 7b is a perspective view of the deflection elements with guide profiles, according to a second embodiment;

FIG. 16a is a front view of an onflow element according to the invention;

FIG. 16b is a lateral view of the onflow element according to the invention, in the direction A according to FIG. 16a;

FIG. 17 is a lateral view of a further embodiment of an onflow element according to the invention;

DETAILED DESCRIPTION OF THE INVENTION

The onflow elements represented in the subsequent FIGS. 1 to 12, with regard to the design of the onflow wall represent an alternative embodiment which is not the subject-matter of the invention. It is however to be emphasized that the embodiment according to the invention, of an onflow element 310 and which is shown according to FIGS. 13 to 17, can be applied with installations as are represented in FIGS. 1, 5a, 5b, 6a, 6b, 7a, 7b, 8 and 10.

Moreover, the embodiments of onflow elements which are shown in FIGS. 1 to 12, with respect to the design and arrangement of the guide as well as the connector on the onflow element and the interlinking of the onflow elements, can also be applied to the onflow element according to the invention or the installation according to the invention. Inasmuch as this is concerned, the onflow element according to FIGS. 1 to 12 differs from the onflow element according to the invention only by way of the shaping of the onflow wall, but not by the other structural features.

Moreover, the guide in the water guidance channel and which is shown in the FIGS. 9a, 9b, 11 and 12 also applies to the onflow element according to the invention or the installation according to the invention.

Figure 1:
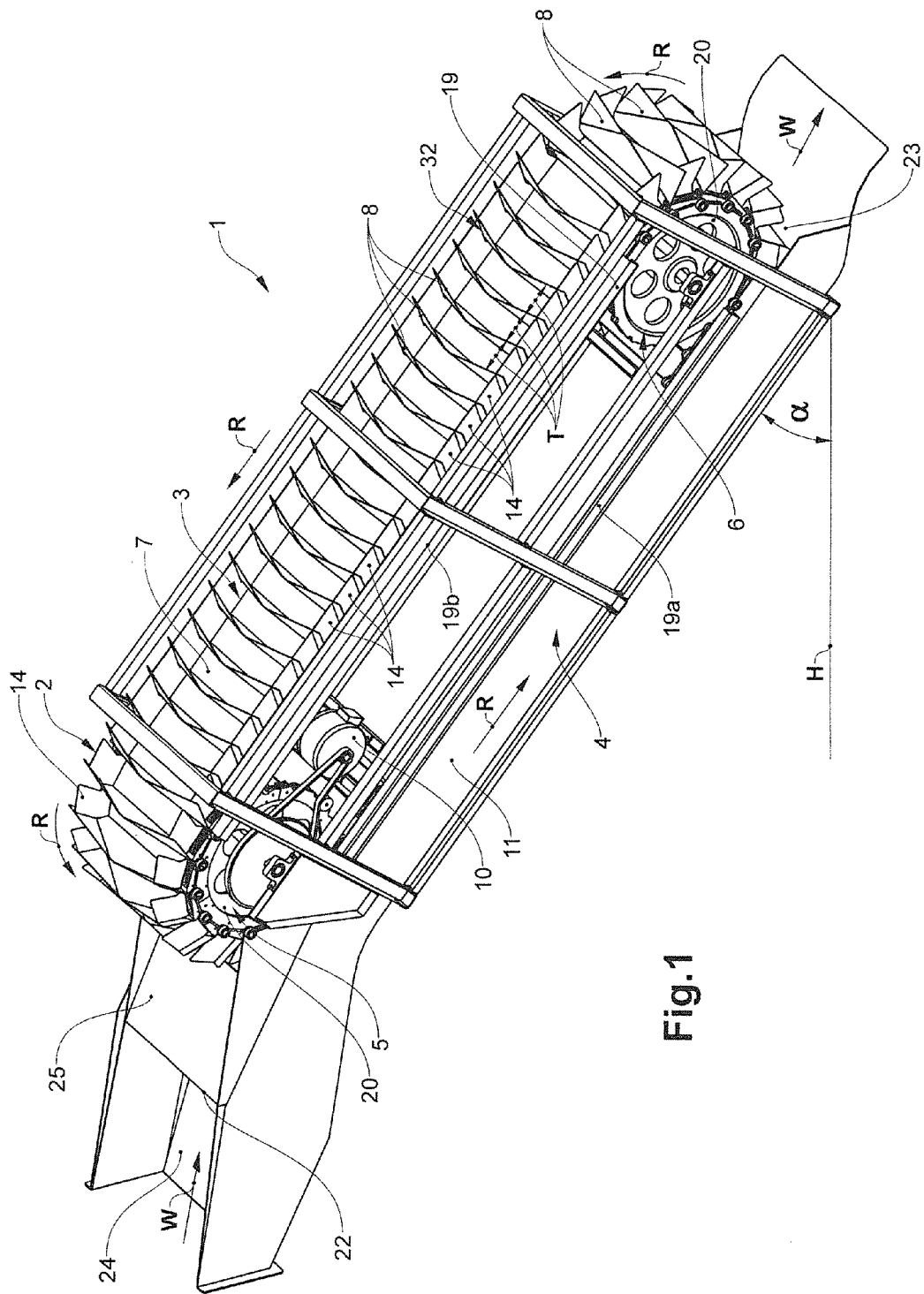
FIG. 1 is a perspective view of an installation according to the invention.
Figure 2A:
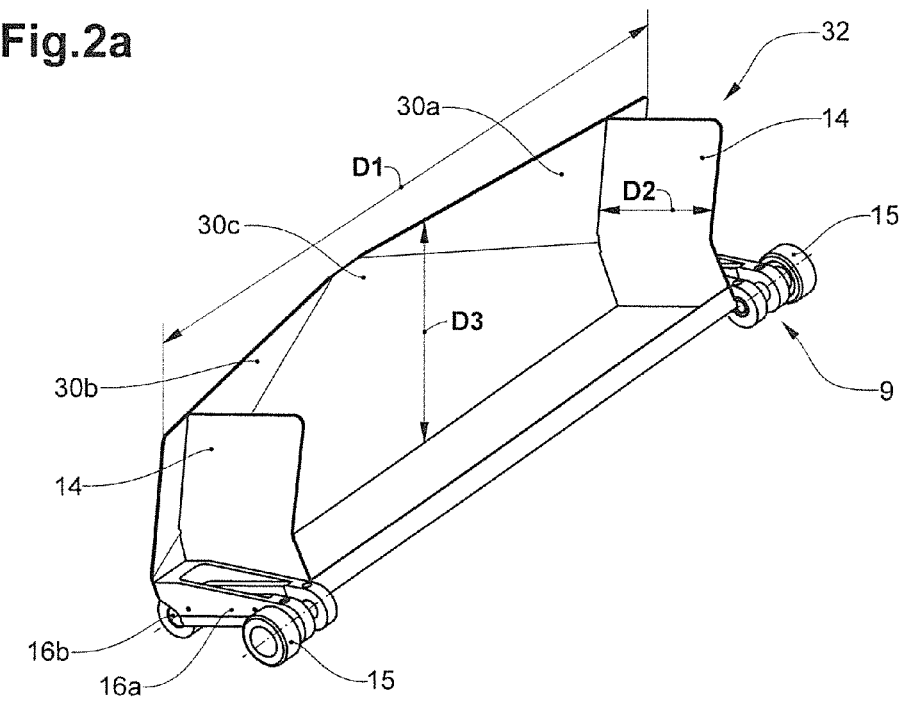
FIG. 2a is a perspective view of an onflow element.
Figure 2B:
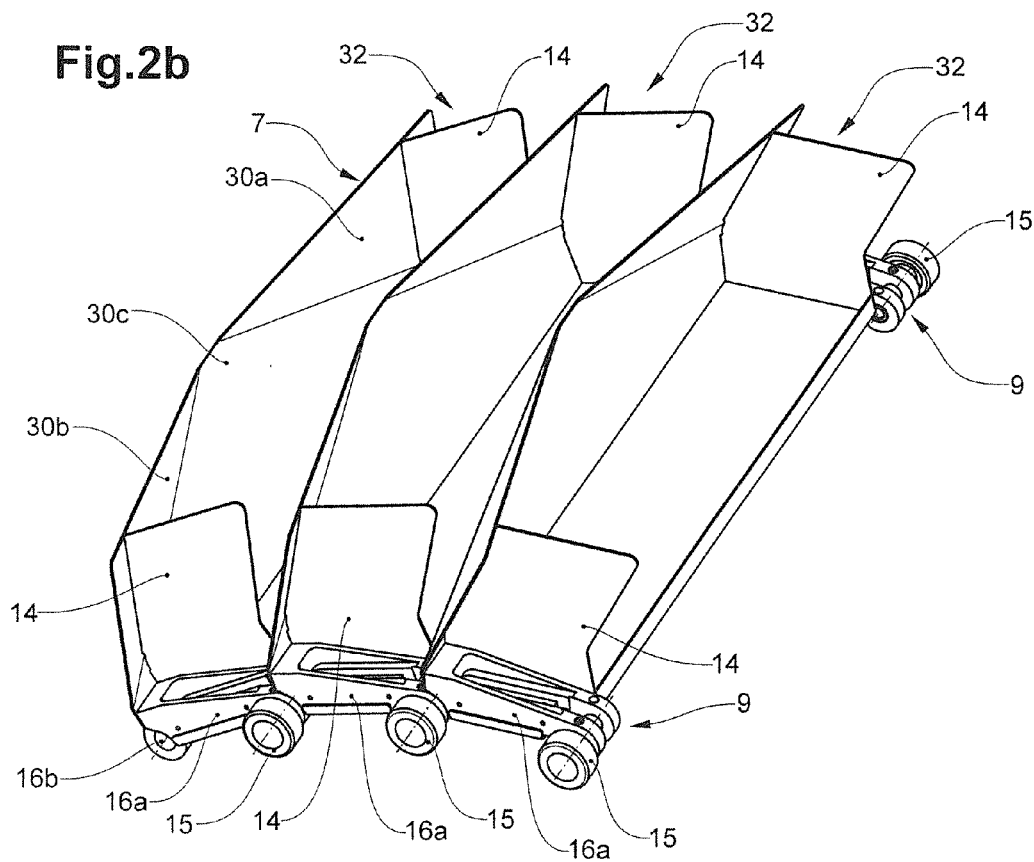
FIG. 2b is a perspective view of onflow elements.

The installation 1 according to FIG. 1 shows a drive arrangement 2 in the form of a coherent drive structure 7, which is led along a revolving direction R around an upper deflection element 5 and a lower deflection element 6. The drive structure 7 includes a load section 4, for example in the form of a load line, which is positively guided along a water guidance channel 11 (see also FIG. 9b), and a return section 3, for example in the form of a return line, which is led above and parallel to this load section.

The drive structure 7 is driven in the revolving direction R. The drive structure 7 is formed from a plurality of onflow elements 32, which are present as drive links 9 (see FIGS. 2a, 2b). The drive links 9 in each case include an onflow wall 8 which, along the load section 4, engages transversely into the water guidance channel 11.

The onflow wall 8 (see FIGS. 2a, 2b) is designed as a blade-like wall element and includes two laterally arranged wall sections 30a, 30b, which are curved or bent away out of the plane of the onflow wall 8 opposite to the movement direction R of the drive structure 7. The bending angle can, for example, be 10-30°. The wall sections 30a, 30b delimit a flat, middle wall section 30c. The onflow wall 8 has a width D1, which is smaller than the channel width by a gap tolerance. The onflow element further has a height D3 and a depth D2. Two adjacent onflow walls 8 together with the channel base 12c as well as the two lateral channel walls 12a, 12b in each case form a so-called water receiving compartment 13, wherein the channel base 12c and the lateral channel walls 12a, 12b are preferably stationary or not moved (see FIGS. 1, 5a, 5b, 6a, 6b and 9a-9c). The onflow walls 8 although being led in a contact-free manner to the water guidance channel 11, these however form a comparatively small gap to the channel walls 12a-12c thanks to the exact guiding of the drive links 9, and only very little water escapes from the water receiving compartments 13 through this gap.

The onflow wall 8 further includes two stiffening elements 14 in the form of transverse walls, which are arranged laterally off-center. The transverse walls 14 however do not represent the lateral closure of the water receiving compartments 13, which as described above are terminate laterally by the two lateral channel walls 12a, 12b. The flow is calmed towards the channel wall 12a, 12b and the eddy formation of the water is reduced by way of the proximity of the transverse walls 14 to the channel walls 12a, 12b.

Each drive link 9 further includes two guide rollers 15 arranged laterally of the onflow wall 8. The onflow element 32 moreover includes a connection element in the form of a fork-like connection element 16a and a connection body 16b lying opposite this in the movement direction R, and both of these are provided with suitable openings for receiving a roller pivot 18 of the guide rollers 15.

The drive links 9 on both sides are pushed with their respective connection bodies 16b into the opening between the fork lugs of the fork-like connection element 16a, for creating the coherent drive structure 7, wherein the roller pivot 18 is pushed through the openings in the fork lugs as well as in the receiver body 16b. Simultaneously, the guide roller 15 is also fastened via the roller pivot 18 on the drive link 9 or on the drive structure 7. Hereby, it is to be noted that the drive links 9 or the drive structure 7 requires no pivot elements that are continuous transverse to the movement direction.

The water guidance channel 11 as well as the load section 4 lie in an oblique plane with a descent that is constant in sections and moreover run parallel to one another. In an upper run-in region 22 (see also FIGS. 5a, 5b, 6a, 6b), the water is led out of the feed channel 24 in the feed direction W to the water guidance channel 11. The water released from the water receiving compartments 13 leaves the installation 1 in a lower outlet region 23.

The run-in region 22 includes a passage limitation element 25. The size of the passage opening and thus the water quantify fed to the water guidance channel 11 can be controlled with the passage limitation element 25, via a suitable controller. However, one can also envisage the passage opening being fixed beforehand and not being changeable during the operation of the installation 1.

The installation further includes a relief channel 27 that runs below the water guidance channel 11 and preferably parallel to this, as is represented in the FIGS. 5a, 5b and 6a, 6b. The access to the relief channel 27 is controlled via a water guiding element 26, which can be an opening flap or an opening slide or a bulkhead.

The water stream can be led into the water guidance channel 11 or into the relief channel 27 via the position of the water guiding element 26. The water guiding element 26 is likewise activated via a control device. The discharge of the water flow W via the relief channel 27 is effected, for example, if the installation must be taken out of operation for overhaul and maintenance purposes. Thus, for example, with a recurring cleaning and maintenance work, the water can be led away through the relief channel 27, so that the water does not lead the dirt through the installation.

Moreover, with the occurrence of much water, a part of the water can be discharged via the relief channel 27. The water guiding element 26 can also generally serve for the regulation of the water inflow into the run-in region, in order thus, for example, to ensure a constant revolving speed of the drive structure.

Moreover, the water or a part thereof can also be discharged via the relief channel 27 if foreign matter such as, for example, solid matter is contained in the water and that could compromise the functioning of the installation 1. As already mentioned, it is also possible for only a part of the water to be discharged via the relief channel 27.

Figure 5A:
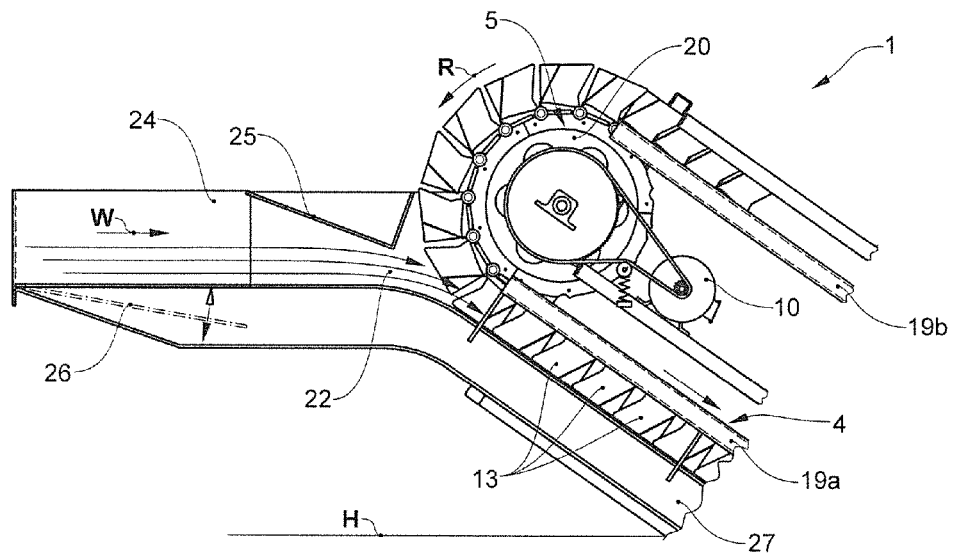
FIGS. 5a and 5b are lateral views of an installation according to the invention, in the run-in region, according to a first embodiment.
Figure 5B:
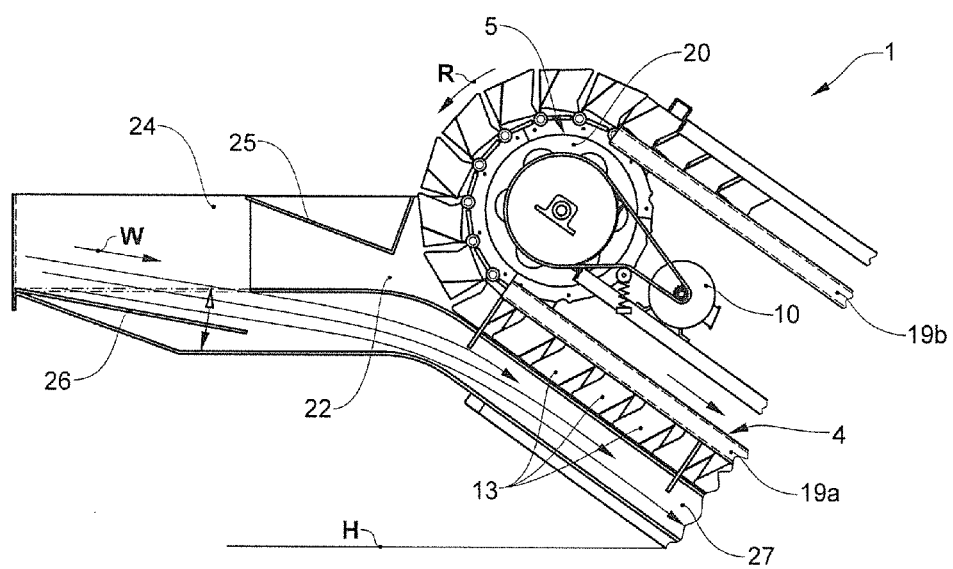
Figure 6A:
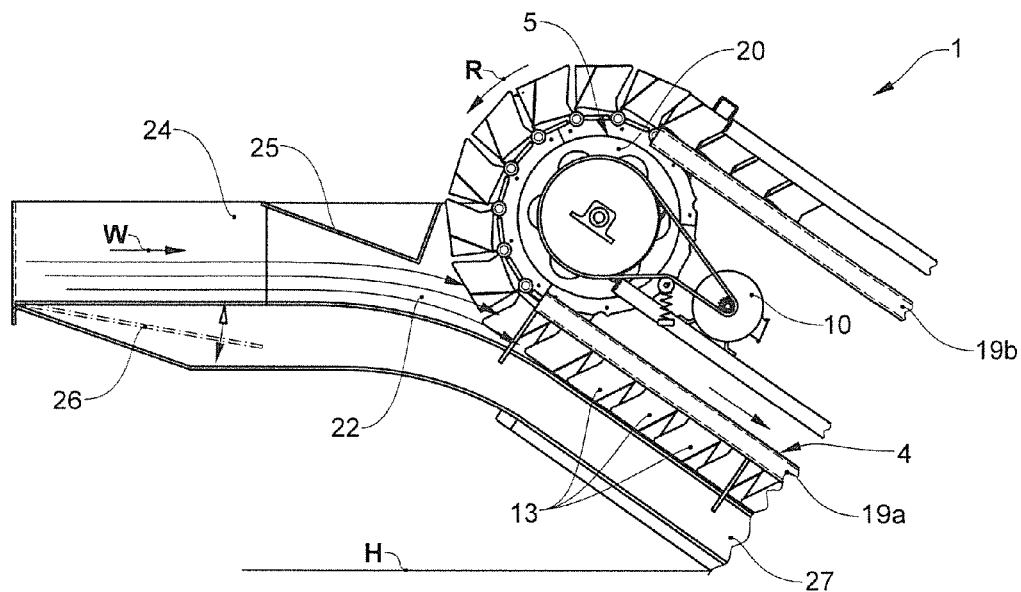
FIGS. 6a and 6b are lateral views of an installation according to the invention, in the run-in region, according to a second embodiment.
Figure 6B:
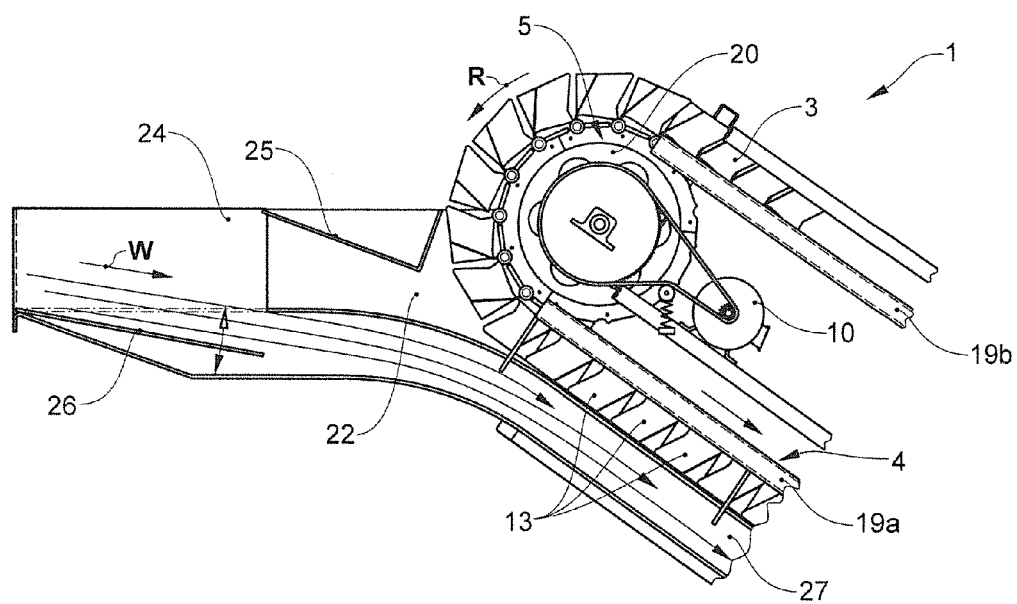

The water guiding element 26 according to the shown embodiment example is an opening flap in the base of the feed channel 24. In this manner, heavy solid matter can be discharged out of the water stream W in targeted manner via the relief channel 27 while the installation is in operation. In the representations according to FIGS. 5a and 6a, the guiding element 26 is set such that the water stream is fed to the water guidance channel 11, while the guiding element 26 in the FIGS. 5b and 6b is set such that the water stream is fed to the relief channel 27.

The onflow walls 8 are led via the upper deflection element 5 into the run-in region 22, wherein these in the run-in region 22 are brought out of a curved path at the deflection element 5 into a linear movement path along the likewise linear water guidance channel 11 beginning in the run-in region 22.

The load section 4 thereby lies in the linear movement path of the onflow walls 8. Simultaneously, the water receiving compartments 13 are also formed in the run-in region 22. This is effected by way of guiding the onflow walls 8 together with the water guidance channel 11, i.e. by way of immersing the onflow walls 8 into the water guidance channel 11.

The water flow in the feed channel 24 is fed horizontally or with a slight decent, to the run-in region 22, where this is then led into the greater descent of the water guidance channel 11. In other words, the inclined water guidance channel 11 connects to the feed channel 24, in the run-in region 22. The water guidance channel 11 as well as the load section 4 has an inclination angle $\alpha$ with respect to a horizontal H.

FIGS. 5 and 6 now differ in the guiding of the onflow walls 8 in the run-in region 22. According to the embodiment variant according to FIG. 5, the run-in region 22 and the guiding of the onflow walls 8 in the run-in region 22 are designed such that in each case only a single, forming water receiving compartment 13 is charged with water in the run-in region 22. This means that the water filling of a water receiving compartment 13 being formed does not occur until the associated onflow wall 8 running on front has immersed into the water guidance channel 11 up to its working position, and closes the water receiving compartment 13 running in front by way of this.

According to the embodiment variant according to FIG. 6, the run-in region 22 and the guiding of the onflow walls 8 in the run-in region 22 is designed such that in each case, two water receiving compartments 13 being formed are simultaneously charged with water W, in the run-in region 12. In this case, the filling of a water receiving compartment 13 being formed, with water, begins already before the associated, onflow wall 8 running in front is immersed into its end position into the water guidance channel 11, so that the water receiving compartment 13 running in front is not yet completely closed. In other words, the gap between the channel base 12c and the onflow wall 8 still has not reached its minimal distance.

A particular embodiment of a lower deflection element 6 is represented in each case in FIGS. 7a and 7b. According to the embodiment according to FIG. 7a, the upper as well as the lower deflection element 5, 6 comprise a rotation body 20 in the form of two laterally arranged drive wheels which are coupled via a rotation shaft and which have drive recesses 28 along their periphery. The drive wheel 20 with the periphery recesses or prominences, such as, for example, teeth, executes the function of a cog.

The power for the generation of electrical energy is taken from the upper deflection element 5. The upper deflection element 5 for this is actively connected to an electricity production generator 10 which, by way of a gear device 29, converts kinetic energy from the rotation movement of the drive structure 7 at the drive wheel 20 and converts it into electrical energy.

In each case, a lower and an upper pair of guide profiles 19a, 19b, which run in parallel and which form the lateral guidance of the drive links 9 in the load section 4 lying at the bottom and in the return section 3 lying at the top, are arranged between the deflection elements 5, 6. The guide profiles 19a, 19b are designed as U-profiles for example, which in each case are open to the drive element 9. They are arranged laterally of the water guidance channel 11 above or in the region of the upper end section of the channel side walls 12a, 12b and are connected to a support device or directly or indirectly to the water guidance channel 11.

Figure 9:
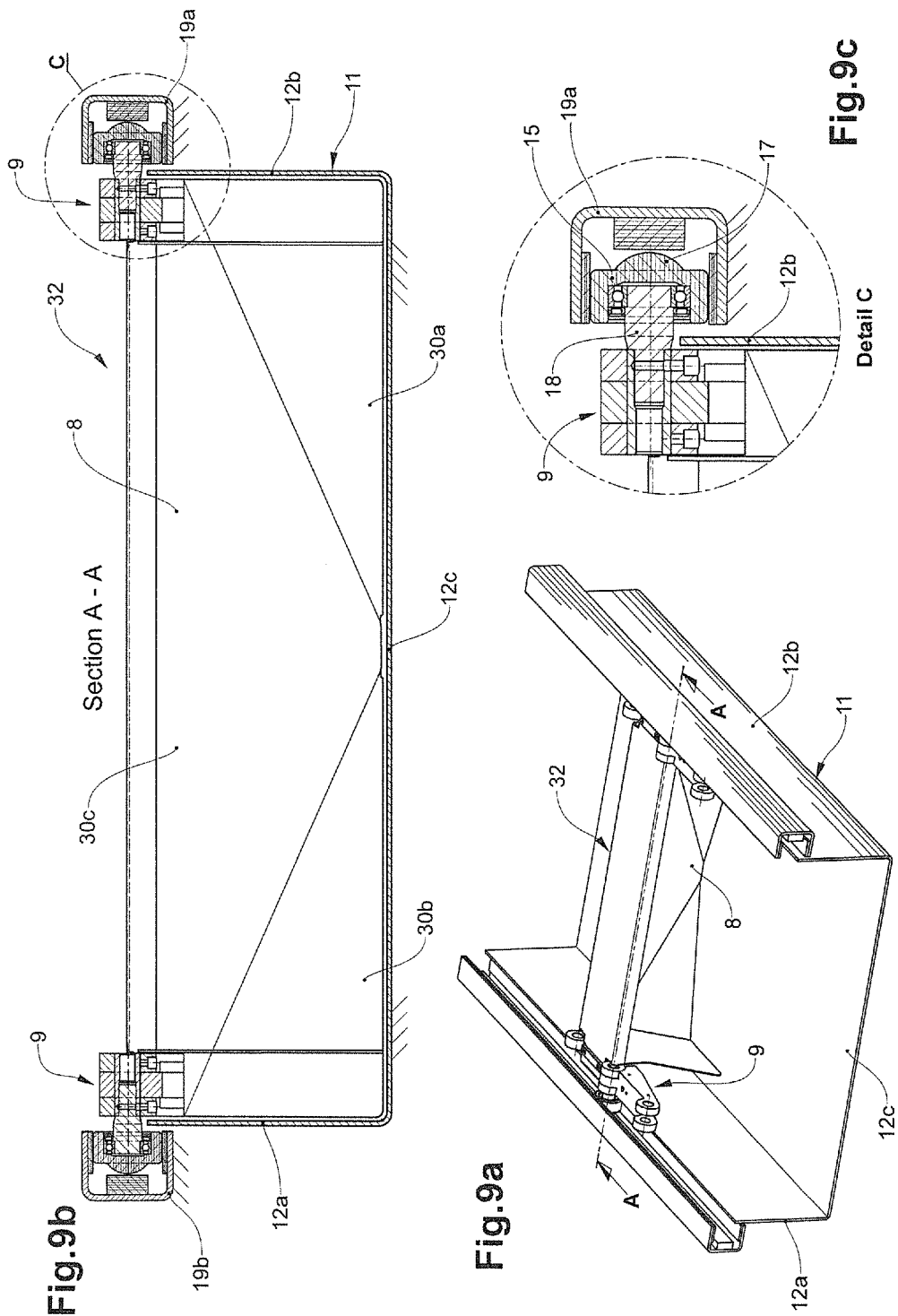
FIGS. 9a to 9c are different views of an individual onflow element led in a water guidance channel.

The guide rollers 15 of the drive elements 9, as is shown in FIG. 3 or 9, engage on both sides laterally into the U-shaped guide profile 19a, 19b and roll along the runner surfaces on the guide profile 19a, 19b. The guide rollers 15 have a rolling surface of plastic such as POM (polyoxymethylene). Moreover, the running surface on the guide profile 19a, 19b also consists of plastic, such as, for example, POM. A low-noise and low-friction running behaviour of the guide rollers 15 is ensured in this manner.

The guide rollers are mounted in a low-friction manner via encapsulated bearings, (ball bearings). The guide rollers 15 moreover include calotte-like side guidance elements 17 that are directed laterally outwards towards the guide profile 10a, 19b and via which the drive links 9 are axially guided in each case. The side guidance elements 17 as also the corresponding guide surface on the guide profile 19a, 19b are preferably of plastic, such as POM. The plastic is characterised by good sliding characteristics and its low water absorption capacity.

The guide rollers 15 of the drive links 9, which are led in the guide profiles 19a, 19b in each case when running into the lower or upper deflection element 5, 6, leave the associated guide profile 19a, 19b, wherein simultaneously the drive links 9 with their roller pivots 19 come to lie in the drive recesses 28. The rotation body 20 is driven by the drive structure 7 by way of this type of positive fit, wherein the drive structure 7 is simultaneously guided in an optimal manner. In the specific embodiment example, the free pivot section lying laterally outside the fork-like connection element 16a comes to lie in the drive recess 28.

The embodiment according to FIG. 7b now differs from the embodiment according to FIG. 7a described above, in that the lower deflection element 6 for the guided deflection of the drive structure 7 does not include a rotation body, but an arcuate guide profile 19c with an arched guide track. The arcuate guide profile 19c connects the lower guide profile 19a of the load section 4 to the upper guide profile 19b of the return section 3.

The drive links 9 of the drive structure 7 in this manner are led along the arched guide track from the load section 4 into the return section 3. The transition arch 91 from the load section 4 into the arcuate guide track of the lower deflection element 6 can be designed as a clothoid.

Figure 10:
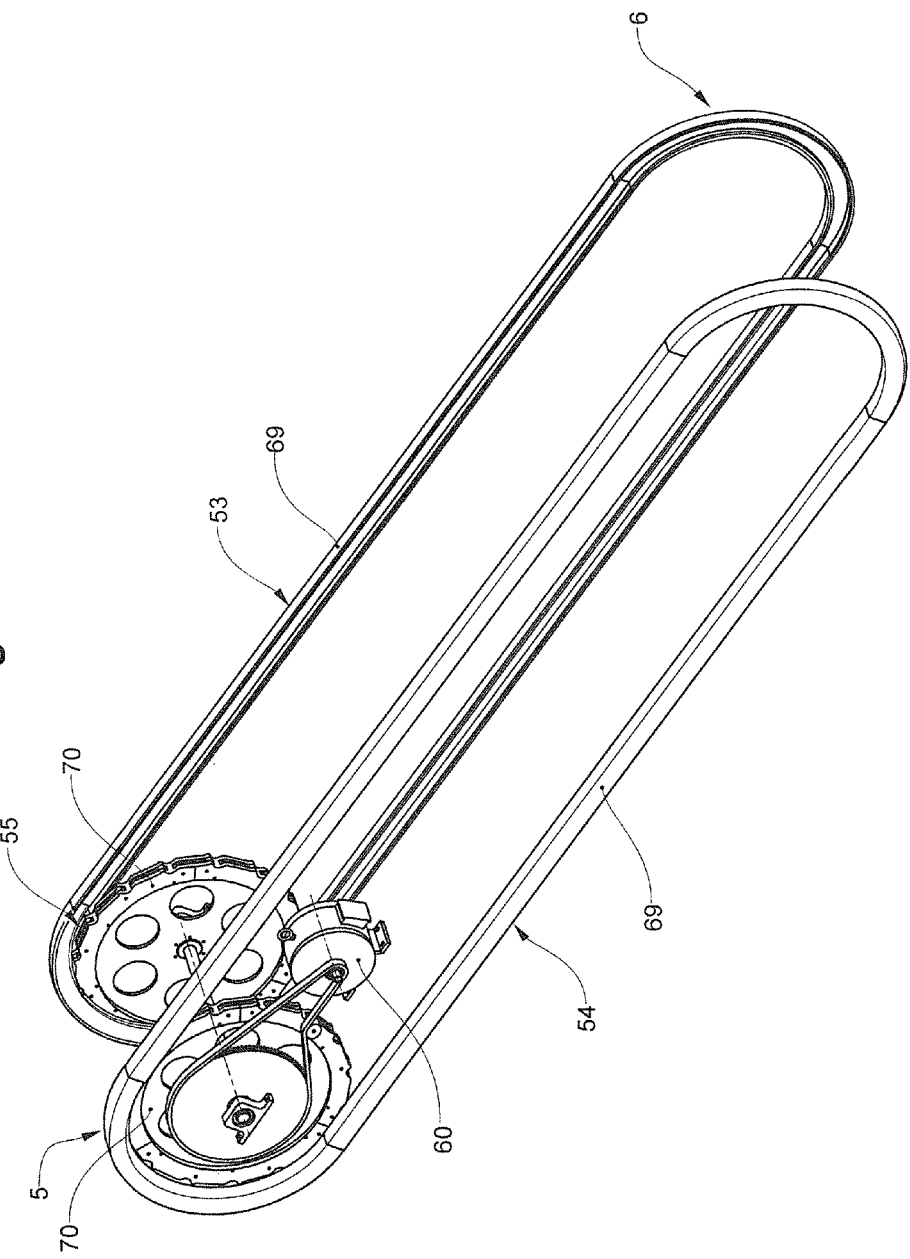
FIG. 10 is a perspective part view of a further embodiment of an instillation with a closed guide rail and with a drive unit.

Of course, the deflection elements 5, 6 can include rotation bodies with recesses for receiving the roller pivots, as well as a curved guide profile with an arched guide track, so that the drive structure 7 is led via the guide rollers in the guide profile as well as via the rotation pivots in the recesses of the drive wheel (see FIG. 10).

Figure 8:
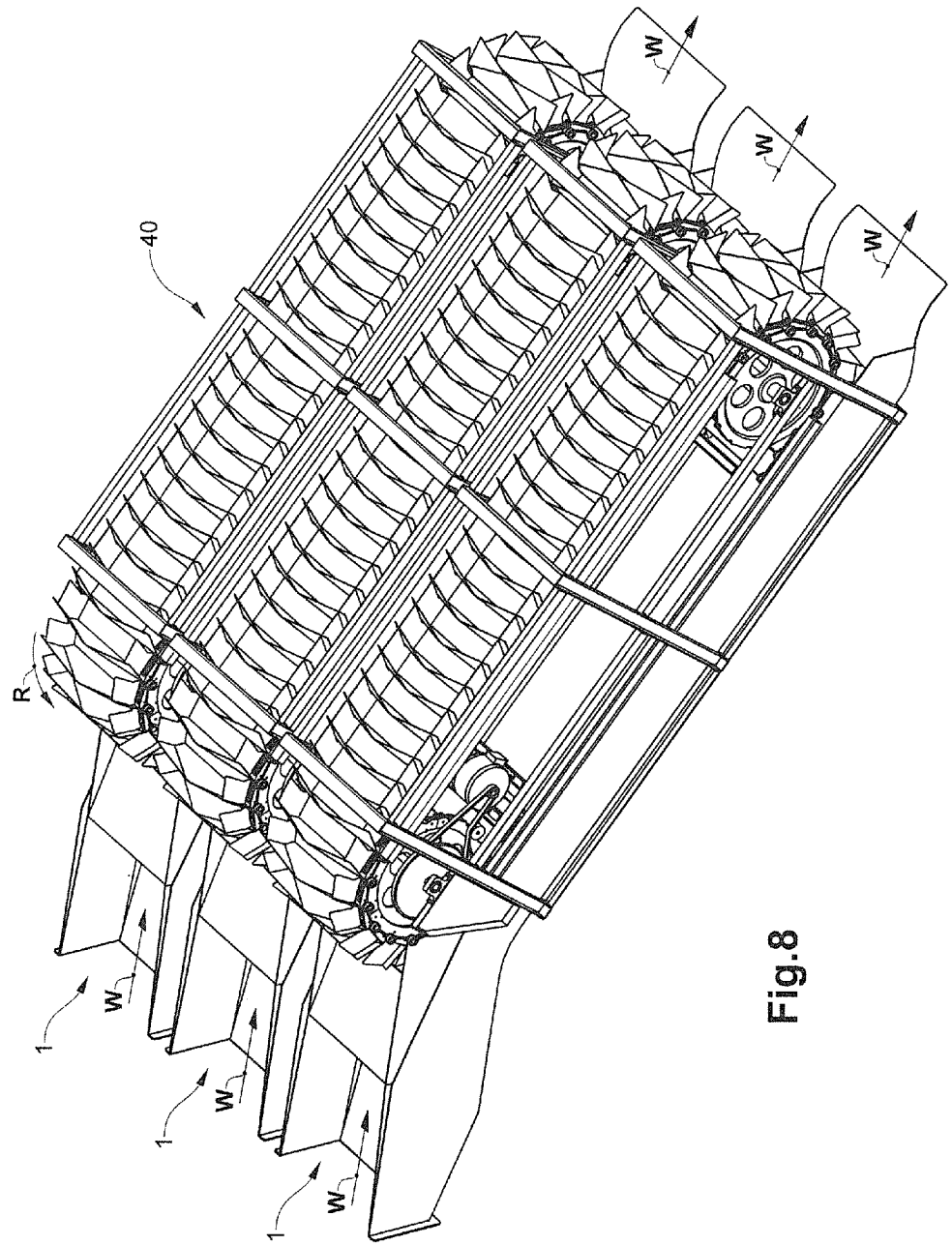
FIG. 8 is a perspective view of a hydropower station with several installations according to FIG. 1.

The installation according to the invention is in particular suitable for a modular construction of a hydropower installation. Thus, for example, several installations according to the invention and which are described above can be arranged next to one another as is shown in FIG. 8 by way of example and in this manner can be combined into a hydropower installation 40. Moreover, also several installations according to the invention can be arranged one after the other or in combination with the previously mentioned parallel arrangement, i.e. in series.

Depending on the occurrence of water, for example, individual installations 1 can be connected or disconnected. This is effected via the control of the water feed into the individual run-in regions.

The perspective part-view of a particular embodiment of an installation according to the invention and which is shown in FIG. 10 comprises two guide rails 69, which are spaced from one another, run parallel to one another and form a closed guidance along a revolving path. The guide rails 69 in each case have and inclined and level guide section in a load section and return section 54, 53.

The guide rails 69 in an upper and a lower deflection region are designed as arched deflection elements 5, 6, which deflect the onflow elements out of the return section into the load section and vice versa. The mentioned arch pieces connect the straight guide sections of the guide rails in the load section and return section 54, 53 in each case into a closed guide track, resulting in a positive guidance.

The guide rails, for example, include a U-shaped profile longitudinal body. The U-shaped profile longitudinal bodies of the guide rails 69 are open towards one another. The onflow elements (not shown) are now arranged between the two guide rails 69 and are guided via suitable guide elements, in the guide rails 69.

In the upper deflection region, the guide rails 69 are guided with their arched sections around or along the periphery of a rotation body 55. The rotation body 55 includes two drive wheels 70 that are spaced from one another and are connected to one another via a rotation shaft.

The drive wheels 70 include drive recesses that are arranged along their periphery and into which the onflow elements engage (not shown) and in this manner drive the rotation body 55.

The rotation body 55 is coupled to the electricity production generator 60 for the purpose of tapping power. The rotation body 55 and thus the electricity production generator 60 are driven by way of the compression force and/or tensile force of the onflow elements.

Figure 11:
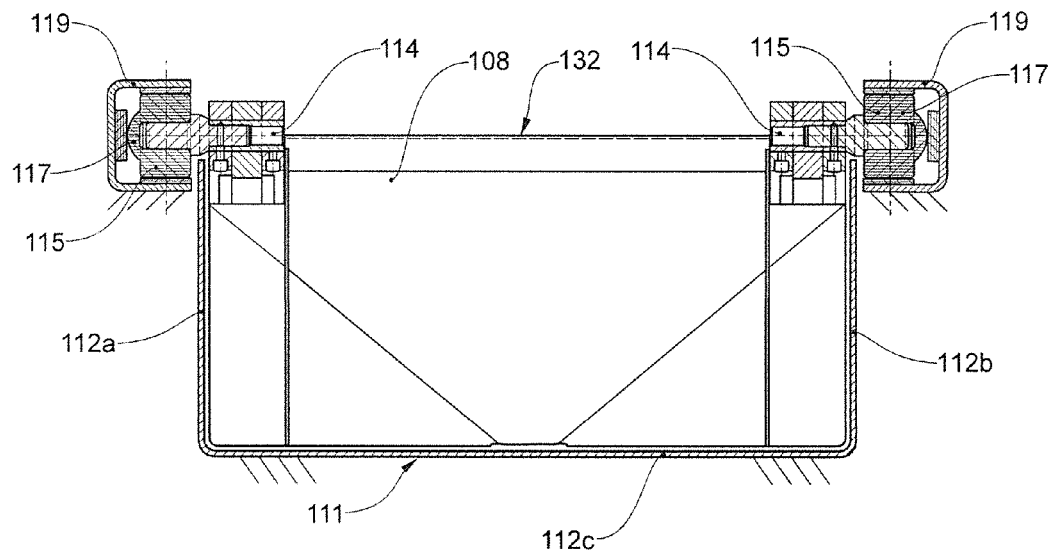
FIG. 11 is a cross sectional view of a further embodiment of an onflow element.

One possible design solution of the positive guiding according to the third sub variant described further above is represented in FIG. 11. The embodiment according to FIG. 11 shows a rectangular water guidance channel 111 with a channel base 112c and two channel side walls 112a, 112b. Guide rails 119 are arranged on both sides, laterally on the water guidance channel 111 in the opening-side region of the channel side walls 112a, 112b.

The onflow element 132 with its onflow wall 108 is arranged in the water guidance channel 111. The onflow wall 108 is guided in the water guidance channel 111 in a contact-free manner, but however assumes practically the complete cross section of the water guidance channel 111 while forming small gap distances.

The onflow element 132 includes two sliding elements 115 which, with respect to the revolving direction, are arranged on the radially inner lying end section of the onflow wall 108 and laterally of this section.

The guide rails 119 each include a U-shaped longitudinal profile that is open towards the sliding elements 115, which are assigned to these guide rails. The longitudinal profiles are thus directed towards one another with the guide channel openings. The sliding elements 115 are led in the guide channel in a sliding manner The sliding elements 115 each include a calotte-like side guidance element 117, which is directed laterally outwards towards the guide rail 119 and via which the onflow element 132 is guided laterally in the guide rail 119.

The sliding elements 115 are fastened on the onflow wall 108 via connection pivots 114 arranged transversely to the revolving direction.

Figure 12:
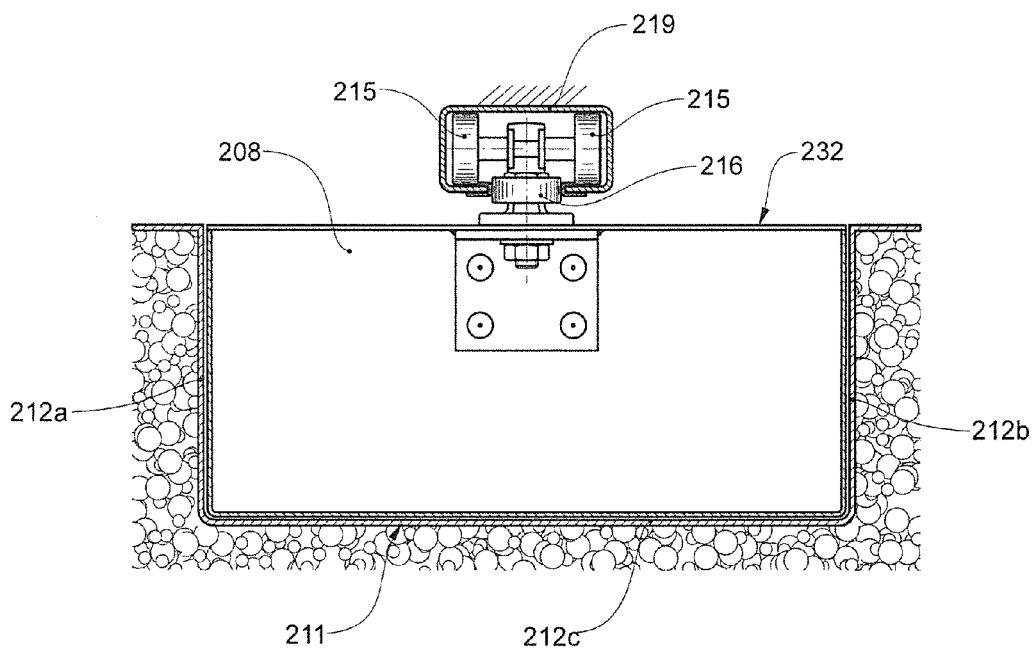
FIG. 12 is a cross sectional view of a further embodiment of an onflow element.
Figure 13:
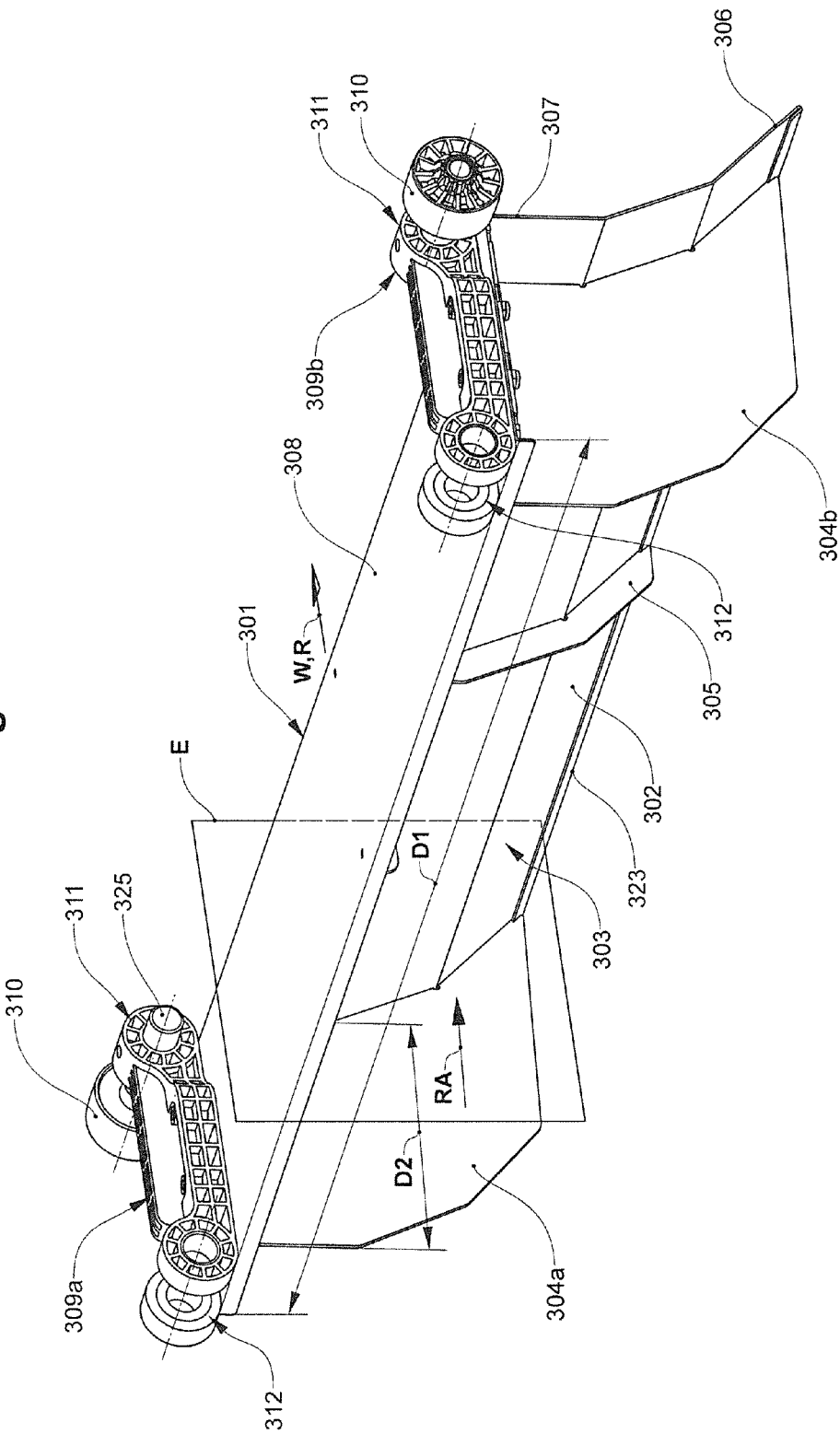
FIG. 13 is a perspective view of an onflow element according to the invention.

One possible design solution of the positive guiding according to the second embodiment variant described further above is represented in FIG. 12. The installation according to FIG. 12 likewise shows a rectangular water guidance channel 211 with a channel base 212c and two channel side walls 212a, 212b.

A guide rail 219 is arranged above the water guidance channel 211. The guide rail 219 has a C-shaped longitudinal profile that is open towards the water guidance channel 21 and forms a gap-like guide channel opening.

The onflow element 232 with its onflow wall 208 is arranged in the water guidance channel 211. The onflow wall 208 is led in the water guidance channel 211 in a contact-free manner but assumes practically the complete cross section of the water guidance channel 211 amid the formation of small gap distances.

The onflow element 232 includes two guide rollers 215 that are spaced from one another, connected to one another via a pivot, and via the onflow wall 208 are arranged between the end sections of the onflow wall 208 and here outside of the water guidance channel 211, the end sections being lateral considered in the peripheral direction. The guide rollers 215 are guided in a rolling manner in the C-shaped guide channel of the guide rail 219.

The guide rollers 215 are connected to the onflow wall 208 via a suspension led through the guide channel opening. The onflow element 232 furthermore in the region of the suspension includes a horizontal guide element 216 that is led in the gap-like guide channel opening and this laterally guides the onflow wall 208. The horizontal guide element 216 can likewise be a roller.

FIGS. 13 to 17 now show an onflow element according to the invention, with an onflow wall 302 that has a new geometry compared to the state of the art. The onflow element 301 or the onflow wall 302 has a width D1 which, due to the gap tolerance, is smaller than the width of the water guidance channel. Moreover, the onflow element has a height D3.

The onflow wall 302 comprises a first, free wall section 306 and a second, guide-side wall end section 307 lying opposite the first wall end section 306. A guide 309a and 309b for guiding the onflow element 301 in a guide device 322 of the installation 300 (see FIGS. 14 and 15) is arranged in the region of the guide-side wall end section 307. The first, free wall end section 306 forms a free immersion edge 323.

The onflow wall 302 is designed arched towards the onflow direction, which is directed to the onflow side 303. In other words, the first wall end section 306 is runs in front compared to the second wall section 307, in the viewing direction RA to the onflow side 303. The bending is formed by three wall sections, which are arranged at an angle to one another.

The onflow wall 302 is reinforced via two stiffening elements 304, 304b in the form of transverse walls, which are arranged laterally and in an off-centered manner. The transverse walls 304a, 304b here too do not represent the lateral closure of the water receiving compartments which, as described further above, are laterally closed by the two channel walls.

The transverse walls 304a, 304b run transversely to the onflow wall 302 and parallel to the revolving direction R of the onflow elements 301.

The onflow element 301 moreover includes an interface wall 308. The interface wall 308 in the region of the first wall end section 306 is arranged transversely to the onflow wall 302 and transversely to the transverse walls 304a, 304b and is connected to the mentioned walls 302, 304a, 304b.

Two guides 309a, 309b arranged laterally off-centered as well as connectors 311, 312 for the mutual connection of onflow elements 301 designed equally are attached on the interface wall 308. The guides 309a, 309b include two guide rollers 310, which are arranged laterally of the onflow wall 302 and are connected to the onflow organ 301 via roller pivots 325.

The connector includes a fork-like connection element 312 and a connection body 311, which lies opposite this along the movement direction R, and these are both provided with suitable openings for receiving the roller pivot of the guide rollers 310. The guide 309a, 309b and the connector are functionally coupled.

For manufacturing the coherent, chain-like drive arrangement 314, the two laterally arranged connection bodies 311 of a first onflow element 301 are introduced into the opening between the fork lugs of corresponding, fork-like connection elements 312 of an adjacent onflow element 301. Subsequently, the roller pivot is pushed through the openings in the fork lugs as well as in the connection body 311, by which means the onflow elements 301 are connected to one another. Moreover, the guide roller 310 is fastened via the roller pivot 325 on the onflow element 301 or on the drive arrangement 314 (see also FIG. 2b).

The onflow elements 301 in the load section 318, which is to say along the water guidance channel 317, are positively guided via their guide rollers 310, in guide rails 322 of a guide device. The guide rails 322 are arranged at the height of the channel opening on both sides in the region of the lateral channel walls (see also FIGS. 9a, 9b, 9c).

Figure 14:
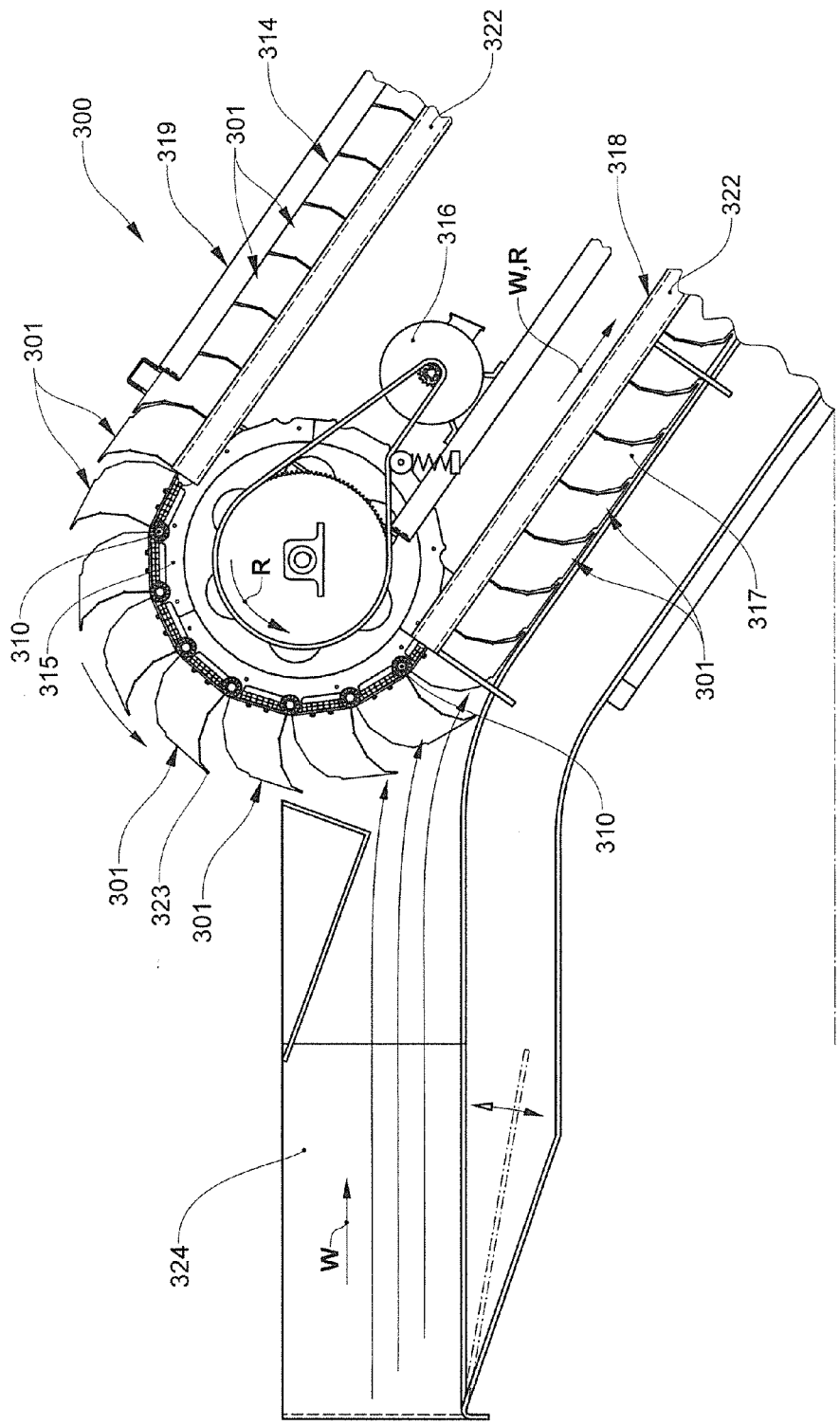
FIG. 14 is a lateral view of an installation according to the invention, in the run-in region, according to a first embodiment.

FIG. 14 shows a detail of an installation 300 according to the invention for the generation of electrical energy from hydropower, and represents the upper run-in region. Water with an onflow direction W is fed via a feed channel 324 to a water guidance channel 317 arranged in an oblique plane. The water guidance channel 317 has a U-shaped profile cross section and comprises a channel base as well as two lateral channel walls (see also FIGS. 9a, 9b and 9c) that are spaced from one another.

An upper deflection element 315 is arranged in the run-in region above the water guidance channel 317, in this embodiment of a drive wheel. The deflection element deflects the onflow elements 301 out of a return section 319 into a load section 318 running parallel to the water guidance channel 317.

The deflection element 315 is arranged such that the onflow elements 301 immerse into the water stream in the run-in region to the water guidance channel 317 and are simultaneously led into the water guidance channel 317. The deflection element 315 is connected to an electricity production generator 316, which takes kinetic energy from the rotational movement of the drive arrangement 314 at the deflection element 315 and converts it into electrical energy.

The onflow elements 301 together with the water guidance channel 317 form water receiving compartments when these onflow elements 301 are introduced into the water guidance channel 317.

Figure 15:
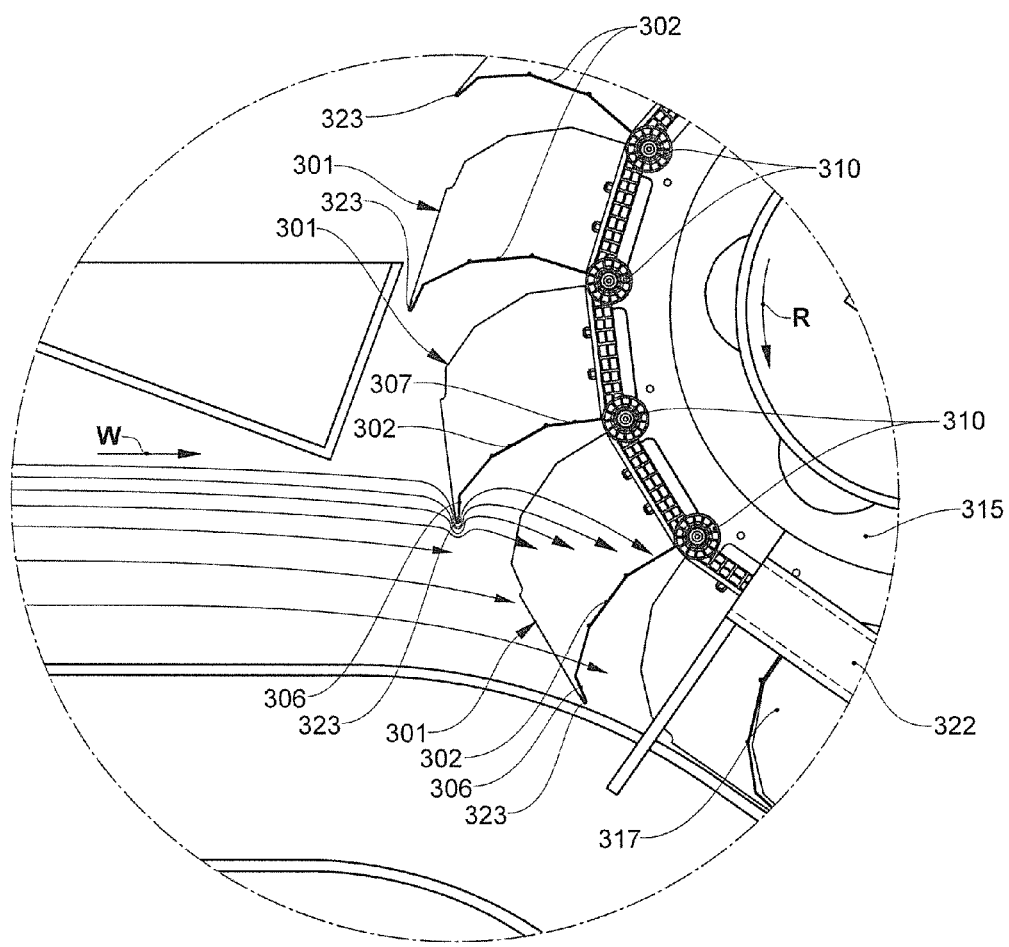
FIG. 15 is an enlarged lateral view of the installation from the run-in region.

The second, free wall end section 306 in the run-in region, due to the geometry according to the invention, of the onflow wall 302, firstly immerses with its free immersion edge 323 into the water stream (see FIG. 15). The second, free wall section 306 is orientated transversely to the flow direction W of the water and therefore acts like a blade cutting the water stream.

The water which flows ahead of the onflow wall 302 is held back in a water receiving compartment running in front, on immersion of the onflow element 301. The water flowing onto the onflow wall 302 in contrast is held back in a water receiving compartment, which runs behind. The onflow wall 302 forms the separating wall between the water receiving compartment running in front (leading) and that which runs behind (trailing).

Figure 18:
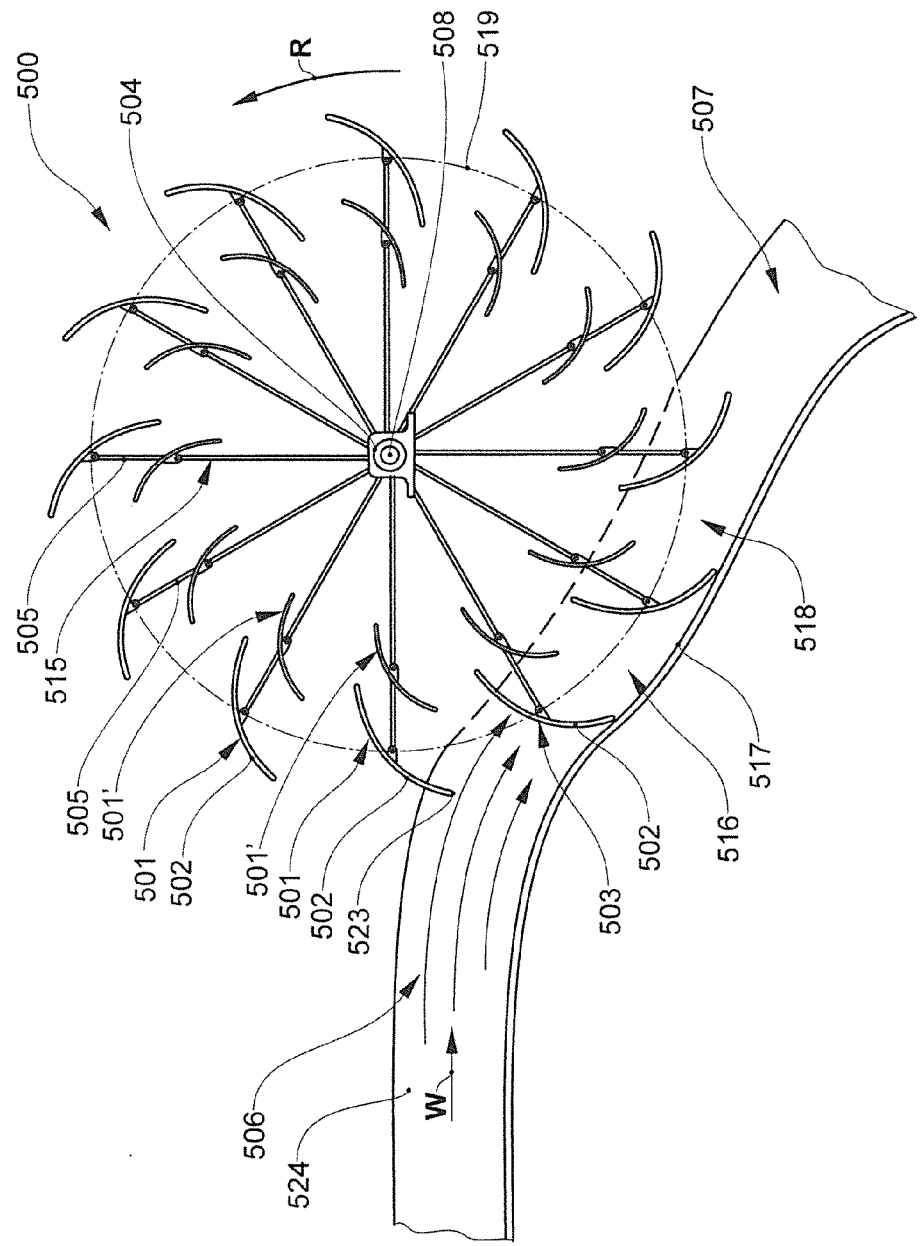
FIG. 18 is a lateral view of an installation according to the invention, and according to a second embodiment.

The installation 500 according to FIG. 18 includes a middleshot drive wheel 515 with onflow elements 501, 501' according to the invention, which are arranged radially outside along its periphery. The drive wheel 515 is designed as a spoked wheel, which includes spokes 505 led outwards in a star-like manner from a drive hub 504. The onflow elements 510 are attached on the spokes 505 radially at the outside.

The drive wheel 515 is rotatably mounted via a rotation shaft 508 led in the drive hub 504. Then electrical energy can be produced from the drive wheel 515 driven by the water stream, via a generator (not shown) that is coupled to the rotation shaft 508.

The drive wheel 515 moreover includes second onflow elements 501', which are likewise arranged on the spokes 505, but lying radially inwards in front of the onflow elements 501. The second onflow elements 501' have the same geometry as the onflow elements 501. However, they are designed smaller. The second onflow elements 501' are optional.

The onflow element 501 includes a blade-like onflow wall 502 which, observed along a cross-sectional plane running parallel to the revolving direction R, is designed in a curved manner. The onflow wall 502 has an onflow side 503, which is subjected to onflow by water in the load section 518. Moreover, the onflow wall 502 includes a free immersion edge 523 that runs in front and immerses first of all into the water stream in the run-in region 506.

The onflow wall 502 is designed arched towards the onflow direction W directed to the onflow side 503. This means that the middle point of the radius of curvature or the middle point of the radii or curvature of the onflow wall 502 are arranged leading or running in front of the onflow element 501.

Thanks to the geometry according to the invention, of the onflow element 501, the onflow element 501 on immersion into the water stream does not hit the water surface, but rather cuts into the stream of water with the leading immersion edge 523.

The installation 500 moreover includes a water guidance channel 517, which is arranged along a load section 518 of the drive wheel 5151 and which leads from a higher lying run-in region 506 to a lower lying outlet region 507. The water guidance channel 517 includes a channel base as well as two lateral channel walls. The onflow elements 501 immerse into a water guidance channel 517, in a higher situated run-in region 506. Thereby, two onflow elements 501, which are directly subsequent one another, together with the water guidance channel 517 in each case form a water receiving compartment 516, which is open to the top.

The water then in the run-in region 506 flows into the water guidance channel 517 and is received by the forming water receiving compartments 516. The drive wheel 515 is driven via the onflow elements 501 by way of the kinetic entry entrained by the flowing water. The water in this manner is led in the water receiving compartments 516 to the lower lying outlet region 507 and there is released out of the water receiving compartments 516 again.

The onflow elements 501 in the outlet region 507 break out of the water stream and are led back to the run-in region again 506 in the so-called return section 519. The run-in region 506 can be located at the height of the drive hub 504 or lower.

The invention claimed is:

1. An onflow element for an installation for generating electrical energy from hydropower, comprising an onflow wall with an onflow side as well as comprising a free immersion edge that delimits the onflow wall, wherein the onflow wall considered in a cross sectional plane transverse to the free immersion edge has a bending,
wherein the bending is designed such that the onflow wall is arched toward an onflow direction directed to the onflow side.

2. The onflow element according to claim 1, wherein the free immersion edge is arranged running in front of the onflow wall considered in the onflow direction to the onflow side.

3. The onflow element according to claim 2, wherein the onflow wall has a width extension and a height extension, and the onflow element has an interface wall that connects to the second wall end section of the onflow wall transversely to this onflow wall and extends over the width extension of the onflow wall.

4. The onflow element according to claim 3, wherein the guide is arranged on the interface wall.

5. The onflow element according to claim 1, wherein the onflow element comprises a guide that guides the onflow element along a guide device, wherein the onflow wall comprises a guide-side wall end section that lies opposite the free immersion edge, and the free immersion edge considered in the onflow direction to the onflow side is arranged running in front with respect the guide-side wall end section and/or with respect to a wall section arranged between the guide-side wall end section and the free immersion edge.

6. The onflow element according to claim 1, wherein the bending of the onflow wall considered in the cross-sectional plane is formed by a polygon course from at least two plane wall sections meeting one another at an angle.

7. The onflow element according to claim 1, wherein the bending of the onflow wall considered in the cross-sectional plane is formed by one or several put-together arc pieces each with an arc radius, wherein the middle points of the arc radii, considered in the onflow direction to the onflow side are arranged running in front of the onflow wall.

8. The onflow element according to claim 1, wherein the onflow wall, preferably on the onflow side, comprises at least one stiffening element that is arranged transversely to the onflow wall and is connected to this onflow wall.

9. The onflow element according to claim 1, wherein the onflow element comprises a connector that connects several onflow elements one after the other into a chain-like drive arrangement.

10. The onflow element according to claim 9, wherein the guide includes guide rollers that are arranged on the connection and are connected to these in each case via a pivot, and the pivot forms a connection element between two onflow element.

11. An installation for generating electrical energy from hydropower, comprising a plurality of onflow elements according to claim 1 that are arranged one after the other, are guided in a revolving manner along a revolving direction in a closed revolving path and are drivable in the revolving direction by way of hydropower, further comprising a load section running along a descent, wherein the onflow elements are guided along the load section in a water guidance channel.

12. The installation according to claim 11, wherein the onflow elements form a drive arrangement that is led around at least one deflection element, preferably around at least two deflection elements that are spaced from one another.

13. The installation according to claim 11, wherein the onflow elements are part of a drive wheel.

14. The installation according to claim 11, wherein the onflow element is designed and guided such that the onflow wall in the run-in region immerses into the water stream with its free immersion edge in front.

15. The installation according to claim 11, wherein the installation along the load section comprises a guide device, in which the guide of the onflow elements are displaceably arranged such that the onflow elements are guidable at least in the region of the load section.

16. The installation according to claim 11, wherein the load section and the water guidance channel run along an oblique plane.

17. The installation according to claim 11, wherein the water guidance channel at least in sections runs parallel to the revolving path of the onflow elements.

18. A method for operating the installation according to claim 11, wherein water is admitted into the inclined water guidance channel in a run-in region, and the onflow elements in the run-in region are introduced into the water guidance channel, wherein the onflow elements in the run-in region immerse transversely into the water stream with their free immersion edges in front, and portion this water stream.

19. The method according to claim 18, wherein the onflow elements cut through the water stream similarly to a blade, on immersing with their free immersion edges, wherein the separation of the water stream is effected with low friction and with a low eddy formation.

* * * * *